United States Patent
Kai

(10) Patent No.: US 9,922,283 B2
(45) Date of Patent: Mar. 20, 2018

(54) RFID TAG AND HIGH FREQUENCY CIRCUIT

(71) Applicant: FUJITSU LIMITED, Kawasaki-shi, Kanagawa (JP)

(72) Inventor: Manabu Kai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/436,743

(22) Filed: Feb. 17, 2017

(65) Prior Publication Data

US 2017/0300801 A1    Oct. 19, 2017

(30) Foreign Application Priority Data

Apr. 13, 2016  (JP) .................................. 2016-080489

(51) Int. Cl.
*G06K 19/077*   (2006.01)
*H01Q 7/00*     (2006.01)
*H01Q 1/22*     (2006.01)

(52) U.S. Cl.
CPC ... *G06K 19/07767* (2013.01); *G06K 19/0772* (2013.01); *G06K 19/07775* (2013.01); *H01Q 1/2208* (2013.01); *H01Q 7/00* (2013.01)

(58) Field of Classification Search
None
See application file for complete search history.

(56) References Cited

U.S. PATENT DOCUMENTS

2007/0229276 A1*  10/2007  Yamagajo ........ G06K 19/07786
                                                                340/572.7
2011/0121080 A1   5/2011   Kai et al.

FOREIGN PATENT DOCUMENTS

| JP | 2002-198763 | 7/2002 |
| JP | 2009-175611 | 8/2009 |
| JP | 2011-109552 | 6/2011 |

* cited by examiner

*Primary Examiner* — Kristy A Haupt
(74) *Attorney, Agent, or Firm* — Fujitsu Patent Center

(57) ABSTRACT

An RFID tag includes: a base portion in a plate shape made of dielectric material; a loop antenna formed by etching and including a first antenna element and a second antenna element disposed in a loop shape along an outer periphery of the base portion; and an IC chip inserted to the loop antenna in series and including a first electrode and a second electrode.

20 Claims, 18 Drawing Sheets

RFID TAG AND HIGH FREQUENCY CIRCUIT

CROSS-REFERENCE TO RELATED APPLICATION

This application is based upon and claims the benefit of priority of the prior Japanese Patent Application No. 2016-080489, filed on Apr. 13, 2016, the entire contents of which are incorporated herein by reference.

FIELD

The embodiments discussed herein are related to an RFID tag and a high frequency circuit.

BACKGROUND

In the related art, there is a resonator including a pattern coil formed on a surface or inner layer surface of a printed circuit board and a pattern capacitor connected to the pattern coil in parallel or in series. Such pattern capacitor is configured to have a plurality of small area patterns formed on the surface or inner layer surface of the printed circuit board.

Examples of the related art include Japanese Laid-open Patent Publication No. 2002-198763.

SUMMARY

According to an aspect of the invention, an RFID tag includes: a base portion in a plate shape made of dielectric material; a loop antenna formed by etching and including a first antenna element and a second antenna element disposed in a loop shape along an outer periphery of the base portion; and an IC chip inserted to the loop antenna in series and including a first electrode and a second electrode.

In the aspect, the first antenna element includes a first base portion disposed along the outer periphery of the base portion, a first wiring portion protruding from the first base portion and being connected to the first electrode, and a plurality of first protruding portions protruding from the first base portion in a comb shape along the first wiring portion.

In the aspect, the second antenna element includes a second base portion disposed along the outer periphery of the base portion, a second wiring portion protruding from the second base portion toward a first terminal and being connected to the second electrode, and a plurality of second protruding portions protruding from the second base portion in a comb shape along the second wiring portion and being disposed alternately with the plurality of first protruding portions. In the above aspect, the second antenna element further includes one of a connection portion in a linear shape formed by the etching such that the connection portion is disposed along the first protruding portion and the second protruding portion and the first base portion and the second base portion are connected to each other and a third protruding portion formed by the etching in which the connection portion is separated.

In the aspect, the connection portion includes a first connection portion and a second connection portion disposed in series between the first base portion and the second base portion and a line width of the first connection portion is narrower than a line width of the second connection portion.

In the aspect, the third protruding portion protrudes from the second base portion along the plurality of second protruding portions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Typically, in the related art, it is described that a size of a pattern coil and a pattern capacitor may be selected in a resonator so that increase and decrease of capacitance of the pattern capacitor offset each other and an LC product is not changed, but it is actually very difficult to make the LC product unchanged.

When the pattern coil and the pattern capacitor are formed by etching, the LC product changes and a resonance frequency may be fluctuated actually due to variation of an etching rate.

A resonance circuit in the related art, there is a problem that a deviation of the resonance frequency is increased as variation in the etching rate is increased, and thus there is a possibility that an appropriate operation may not be performed.

As an aspect of the following disclosure, provided are solutions for an RFID tag and a high frequency circuit which may perform an appropriate operation.

Hereinafter, embodiments to which the RFID tag and the high frequency circuit of the present disclosure are applied will be described.

Figure 1:
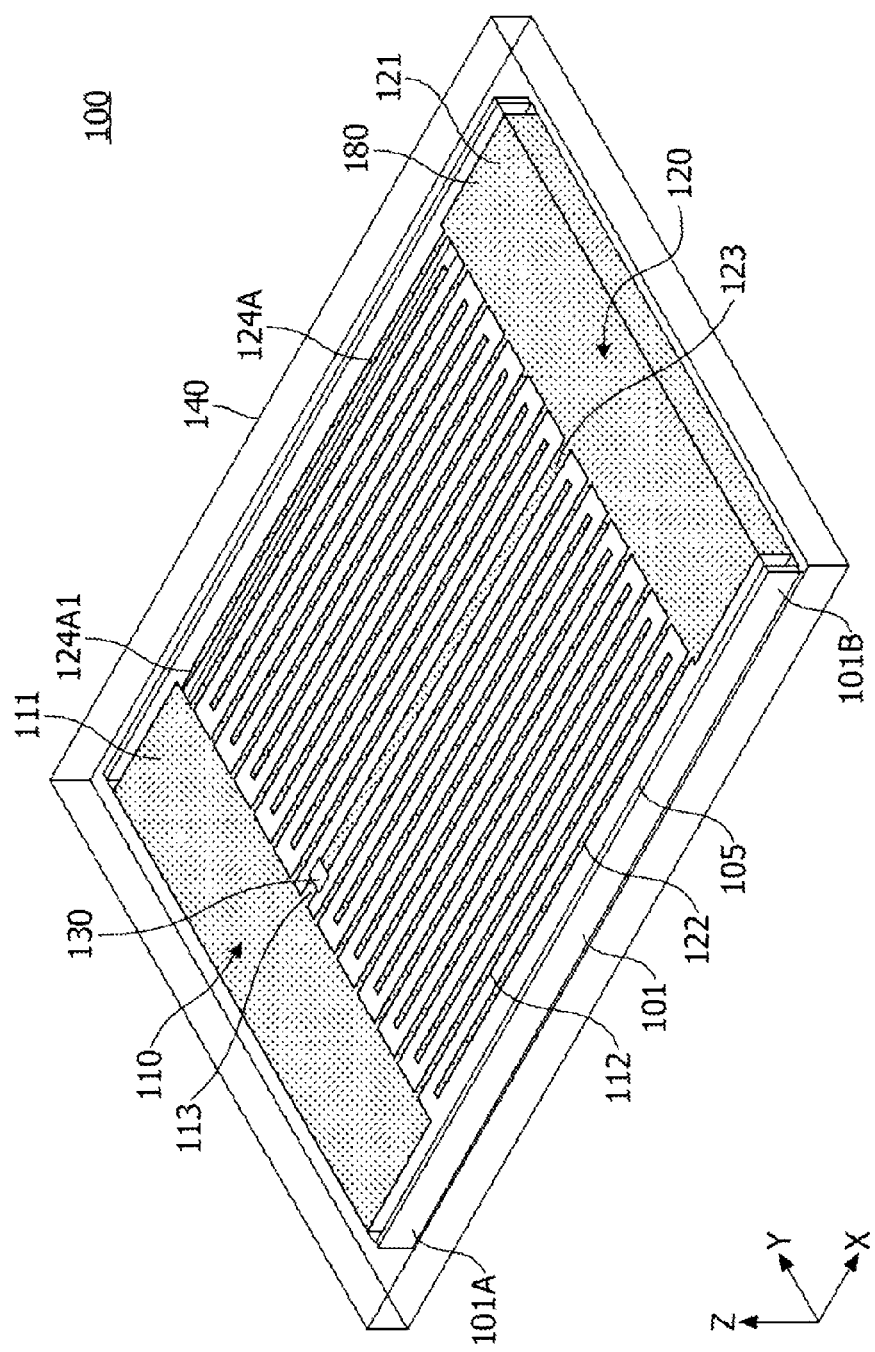
FIG. 1 is a diagram illustrating an RFID tag of Embodiment 1.

FIG. 1 is a diagram illustrating an RFID tag 100 of Embodiment 1.

The RFID tag 100 of Embodiment 1 includes a base portion 101, a sheet portion 105, antenna elements 110 and 120, an IC chip 130, and a cover portion 140.

Hereinafter, a configuration of the RFID tag 100 will be described using FIGS. 2 to 6 in addition to FIG. 1. In FIGS. 1 to 6, an XYZ coordinate system is defined.

Figure 2:
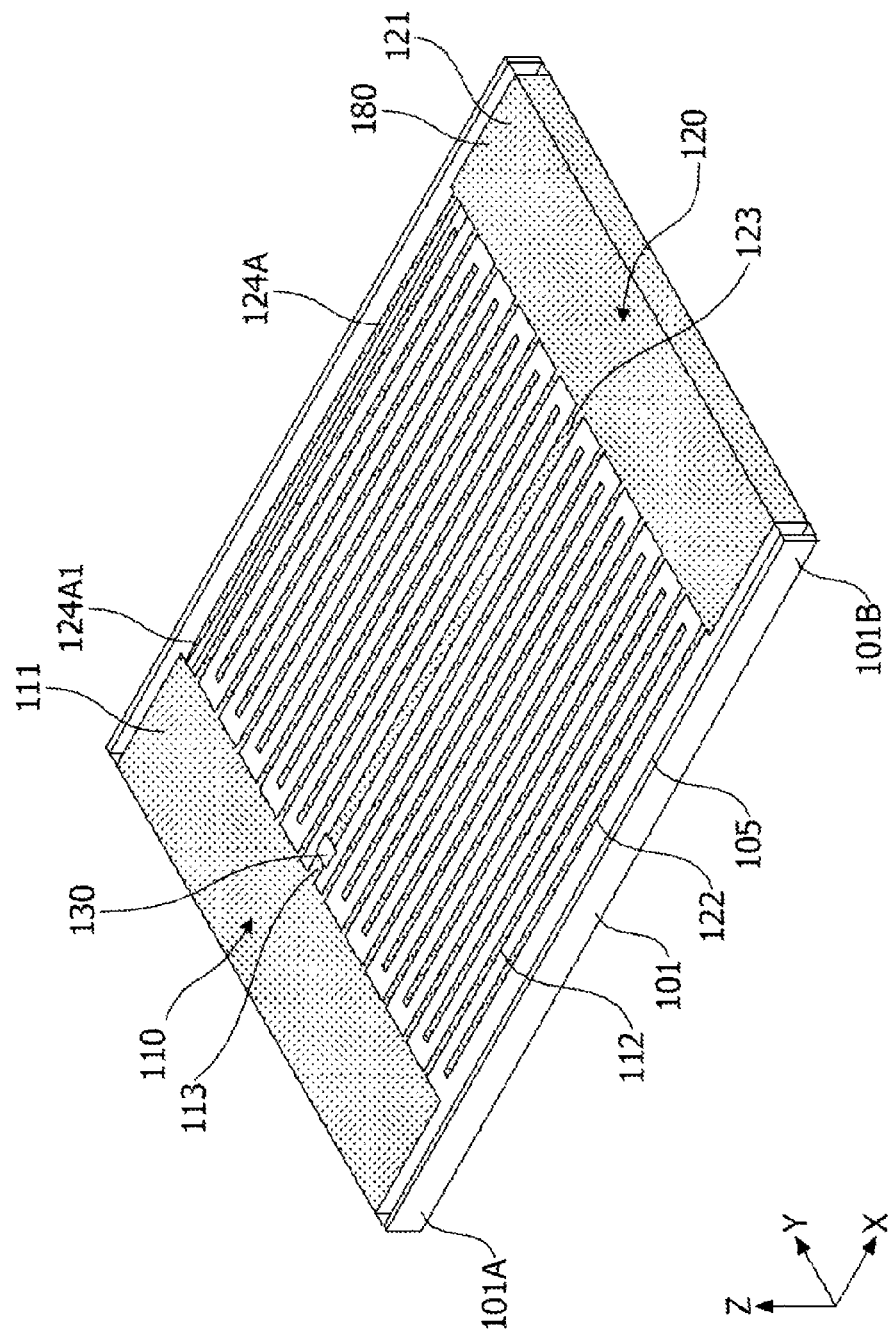
FIG. 2 is a diagram illustrating a configuration in which a cover portion is removed from the RFID tag illustrated in FIG. 1.
Figure 3:
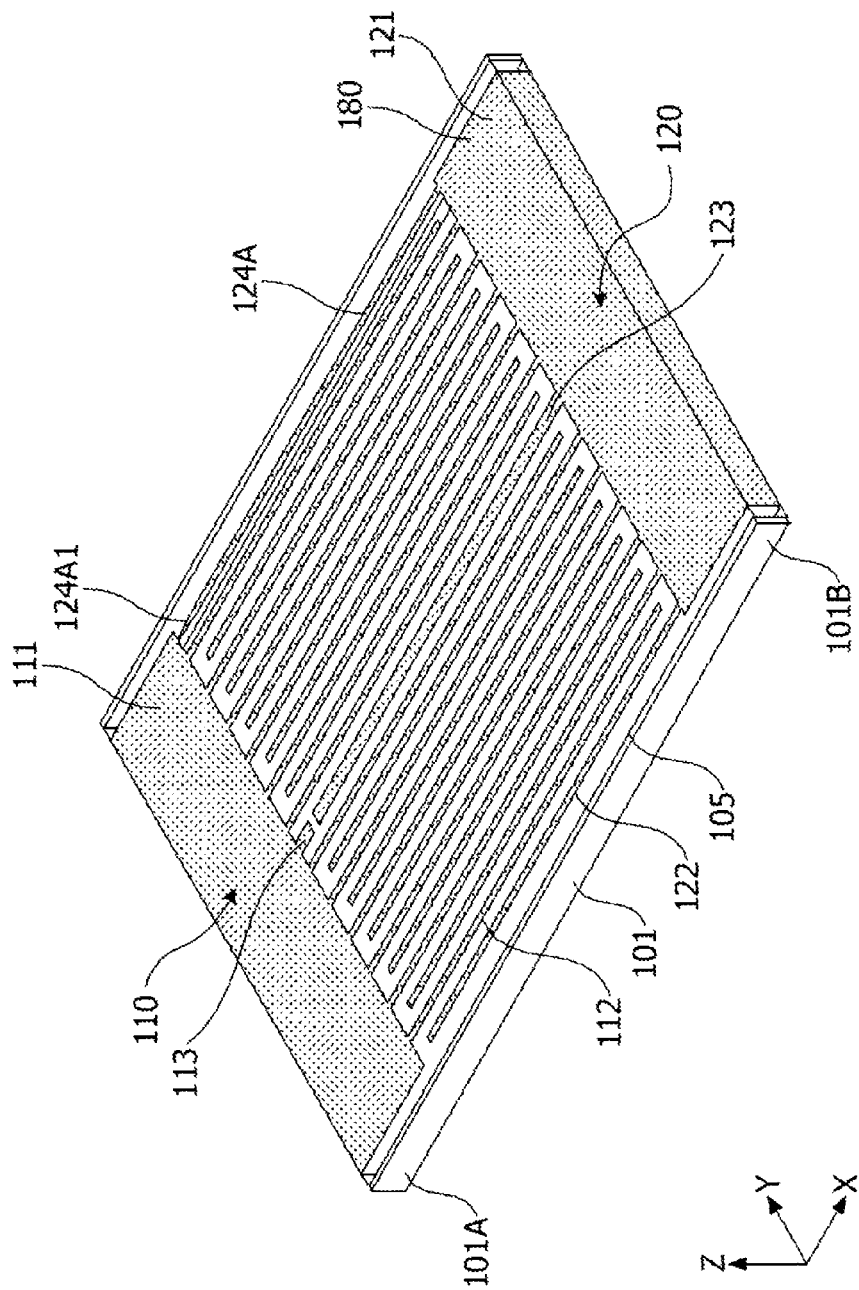
FIG. 3 is a diagram illustrating a configuration in which an IC chip and the cover portion are removed from the RFID tag illustrated in FIG. 1.
Figure 4A:
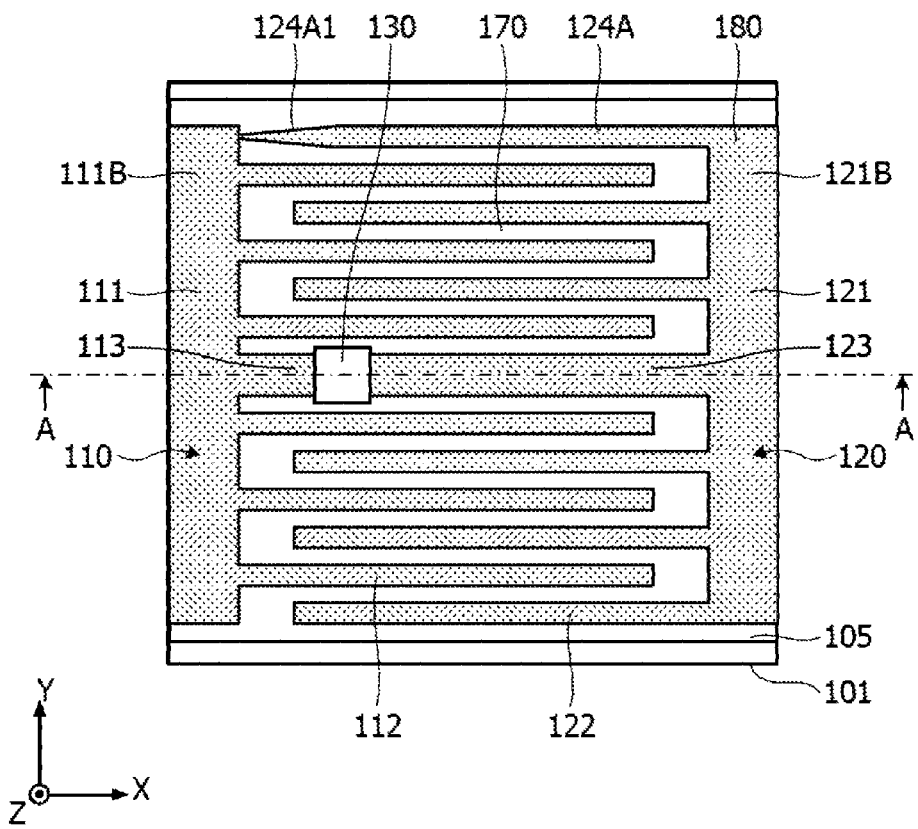
FIGS. 4A and 4B are diagrams illustrating a base portion, a sheet portion, an antenna element, and the IC chip.
Figure 4B:
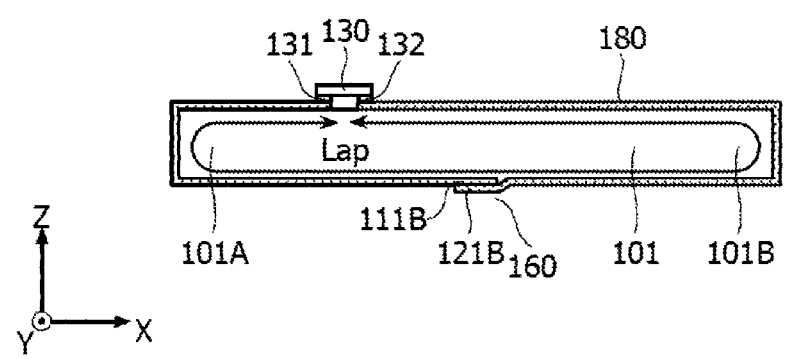
Figure 5:
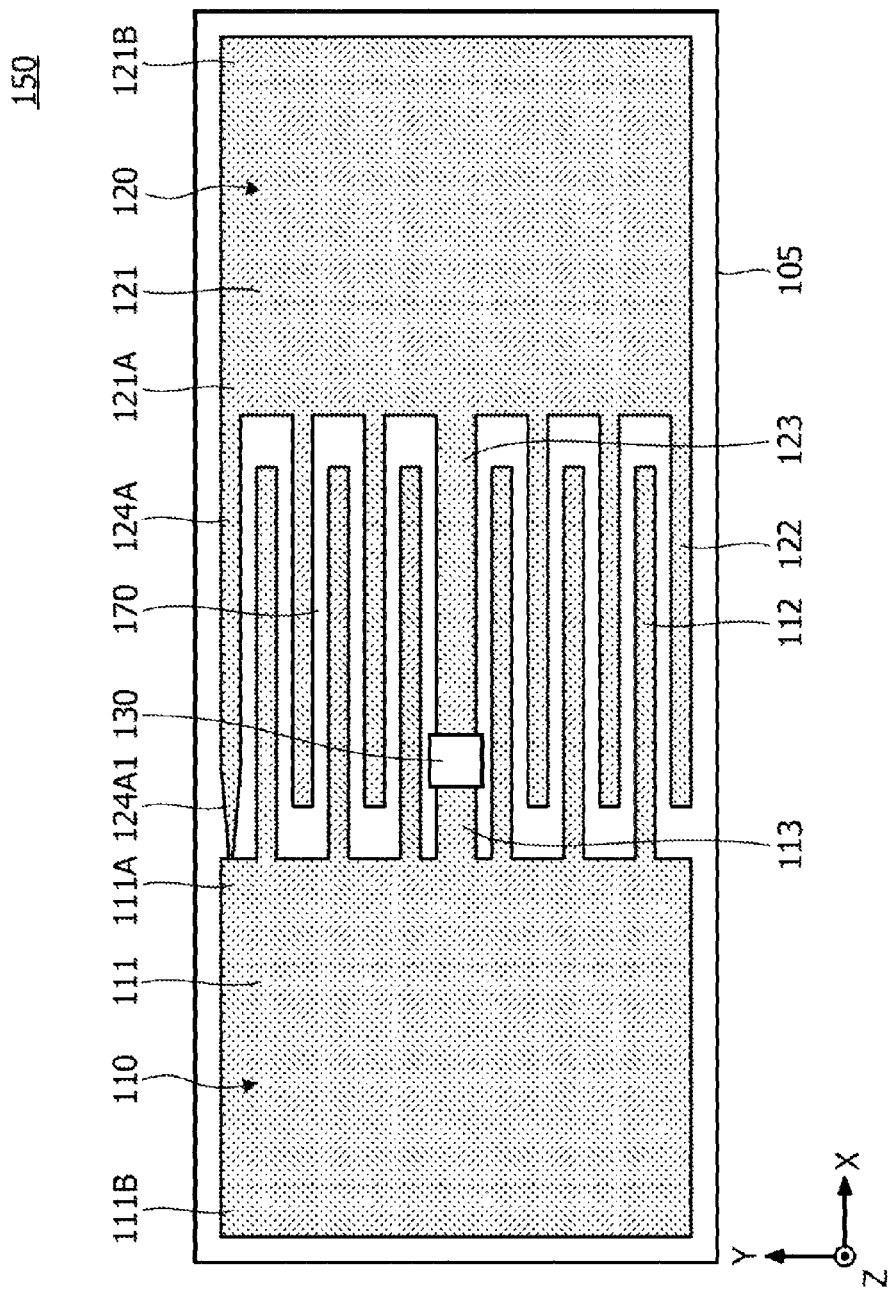
FIG. 5 is a diagram illustrating an inlay.
Figure 6:
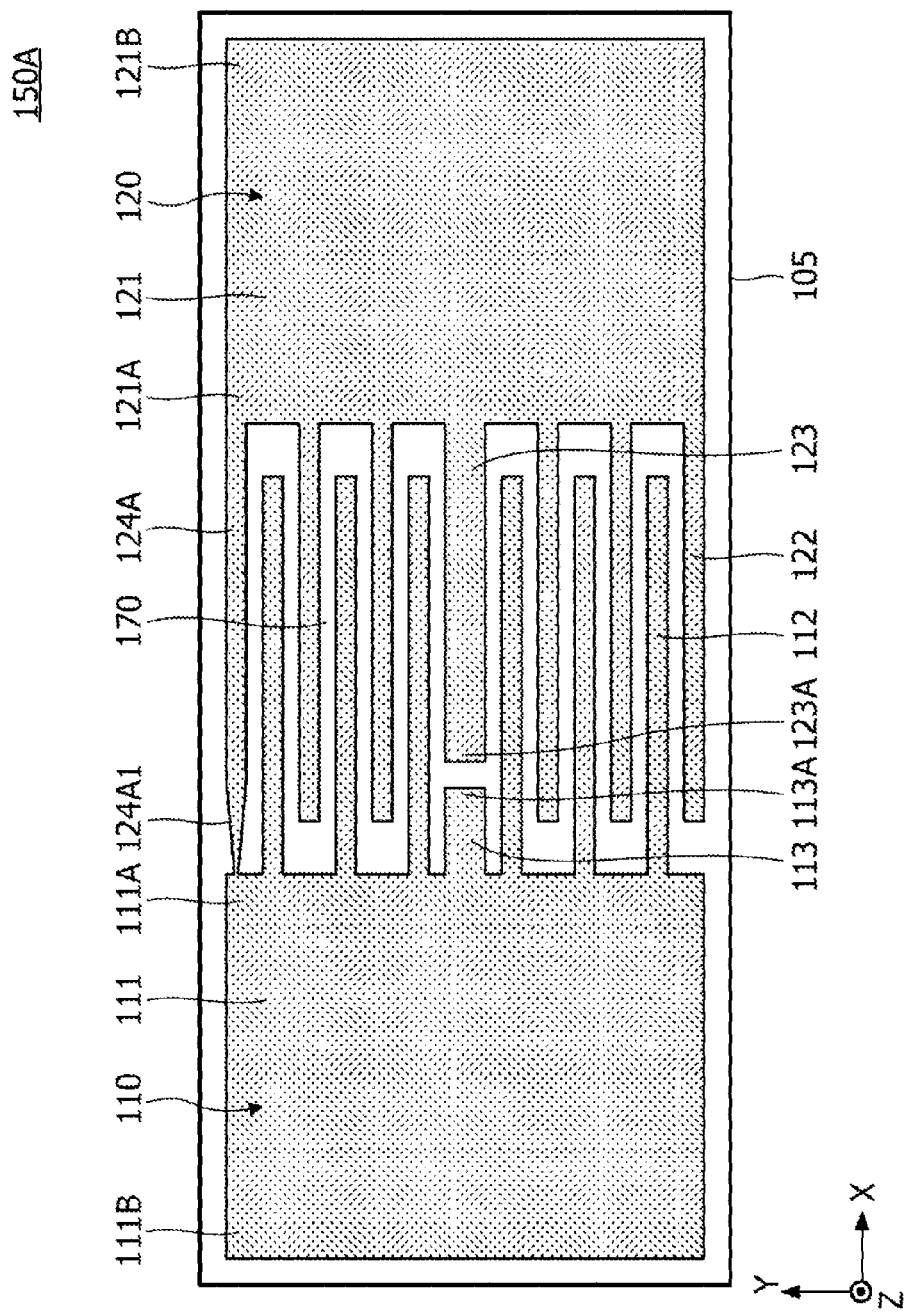
FIG. 6 is a diagram illustrating an element obtained by removing the IC chip from the inlay illustrated in FIG. 5.

FIG. 2 is a diagram illustrating a configuration in which the cover portion 140 is removed from the RFID tag 100 illustrated in FIG. 1. FIG. 3 is a diagram illustrating a configuration in which the IC chip 130 and the cover portion 140 are removed from the RFID tag 100 illustrated in FIG. 1. FIGS. 4A and 4B are diagrams illustrating the base portion 101, the sheet portion 105, the antenna elements 110 and 120, and the IC chip 130. FIG. 4A is a diagram illustrating a configuration in which the cover portion 140 is removed from the RFID tag 100 and FIG. 4B illustrates a cross section taken along a line IVB-IVB in FIG. 4A. FIG. 5 is a diagram illustrating an inlay 150. FIG. 6 is a diagram illustrating an element 150A obtained by removing the IC chip 130 from the inlay 150 illustrated in FIG. 5. The element 150A may be treated as an antenna device.

The inlay 150 is configured to have the sheet portion 105, the antenna elements 110 and 120, and the IC chip 130.

Hereinafter, an overall configuration of the RFID tag 100 will be described using FIGS. 1 to 3. The RFID tag 100 is illustrated to be transparent in FIGS. 1 to 3 so that an internal configuration is easy to understand. In addition, a detailed configuration of the antenna elements 110 and 120, the IC chip 130, the inlay 150, and the like will be descried using FIGS. 4A to 6.

In addition, a surface of the RFID tag 100 in a thin plate shape on which the IC chip 130 is mounted is referred to as an upper surface and a surface opposite to the upper surface is referred to as a bottom surface. The bottom surface is an attachment surface for attaching the RFID tag 100 to a metal object or a nonmetal object or the like using, for example, an adhesive.

Hereinafter, as an example, the RFID tag 100 having a resonance frequency of 892 MHz will be described. That is, in the RFID tag 100 of Embodiment 1, dimensions, inductance, capacitance, and the like of each of parts are optimized so that the resonance frequency of the RFID tag 100 is 892 MHz. In a case where the resonance frequency is a frequency other than 892 MHz, dimensions, inductance, capacitance, and the like of each of the parts may be optimized so that the resonance frequency of the RFID tag 100 is a desired resonance frequency.

As illustrated in FIGS. 1 to 4B, the base portion 101 is a member in a thin plate shape (rectangular shape). The base portion 101 may be made of dielectric material and may be made of, for example, ABS resin, polyethylene terephthalate (PET) resin, polycarbonate resin, polyvinyl chloride (PVC) resin, or the like.

As illustrated in FIG. 1, the inlay 150 (see FIG. 5) is wound around the base portion 101 in the X-axis direction. A length of the base portion 101 in the X-axis direction is approximately 31 mm, a width in the Y-axis direction is approximately 23 mm, and a thickness in the Z-axis direction is approximately 1.2 mm.

Here, end portions of the base portion 101 in the X-axis direction are referred to as end portions 101A and 101B.

As illustrated in FIG. 5, the sheet portion 105 is a rectangular film in plan view, and antenna elements 110 and 120 are formed on one surface of the sheet portion 105. The sheet portion 105 is an example of a sheet member. The sheet portion 105 is, for example, a member in a film shape made of PET film, PET resin, or paper.

The antenna elements 110 and 120 are formed on one surface of the sheet portion 105 and the sheet portion 105 is wound around and bonded to the base portion 101 in a state where further the IC chip 130 is mounted. That is, the sheet portion 105 is wound around and bonded to the base portion 101 in a state where the inlay 150 (see FIG. 6) is completed and the IC chip 130 is mounted.

As illustrated in FIG. 5 and FIG. 6, the antenna element 110 is formed within an area of approximately one half of one surface of the sheet portion 105 in the longitudinal direction (X-axis direction). The antenna element 110 is an example of a first antenna element.

The antenna element 110 includes an element 111, a protruding portion 112, and a wiring portion 113. The antenna element 110 and the antenna element 120 constitute a loop antenna 180. The loop antenna 180 is provided to wind around the base portion 101 in the X-axis direction. A length of the loop antenna 180 in the X-axis direction is approximately 31 mm, a width of the loop antenna 180 in the Y-axis direction is approximately 21 mm, and a height of the loop antenna 180 in the Z-axis direction is approximately 1.2 mm.

The antenna element 110 may be made of metal and may be aluminum, copper, or the like. The antenna element 110 may be made by, for example, wet etching together with the antenna element 120. The antenna elements 110 and 120 may be patterned by providing a metal foil such as a copper foil on one surface of the sheet portion 105 and performing wet etching.

Before the wet etching is performed, a mask is opened according to a shape of the antenna elements 110 and 120, and used to expose a resist formed on the metal foil by photolithography.

The element 111 is a radiation portion in a rectangular shape in plan view. The protruding portion 112, the wiring portion 113, and a tapered portion 124A1 of a tip of a connection portion 124A of the antenna element 120 described below are connected to an end portion 111A of the positive X-axis direction side of the element 111. The element 111 includes an end portion 111B opposite the end portion 111A. The element 111 is an example of a first base portion.

The element 111 is provided in the range from the end portion 111A positioned on an upper surface side of the base portion 101 to the end portion 111B positioned on a bottom surface side of the base portion 101, and is bent at the end portion 101A of the base portion 101.

As illustrated in FIG. 4B, the end portion 111B is overlapped with an end portion 121B of an element 121 described below on the bottom surface side of the base portion 101 in a state where the inlay 150 is wound around the base portion 101.

A part in which the end portion 111B and the end portion 121B are overlapped with each other in plan view constitutes an overlapped portion 160. In the overlapped portion 160, the end portion 111B and the end portion 121B are insulated by the sheet portion 105.

As illustrated FIGS. 4A to 6, the protruding portion 112 extends from the end portion 111A of the element 111 so as to protrude in the positive X-axis direction. Three protruding portions 112 are provided on a positive Y-axis direction side with respect to the wiring portion 113 and the three protruding portions 112 are provided on a negative Y-axis direction side with respect to the wiring portion 113. Lengths of six protruding portions 112 in the X-axis direction are all equal to each other. The protruding portion 112 is an example of a first protruding portion. Note that since FIG. 1 to FIG. 3 are illustrated based on a simulation model described below, twelve protruding portions 112 are provided.

Widths (widths in the Y-axis direction) of the six protruding portions 112 are equal to each other and each of the six protruding portions 112 has a uniform width (width in the Y-axis direction) from a side connected to the element 111 to a tip of a positive X-axis direction side of the protruding portion 112. The protruding portion 112 and a protruding portion 122 of the antenna element 120 are arranged alternately in plan view.

The protruding portion 112, the wiring portion 113, the protruding portion 122, and a wiring portion 123 constitute an interdigital portion 170. The interdigital portion 170 functions as a capacitor having a predetermined capacitance. The interdigital portion 170 may be treated as a capacitor connected in parallel to the loop antenna 180 constituted by the antenna elements 110 and 120.

Each of dimensions such as lengths in the X-axis direction, widths in the Y-axis direction, heights in the Z-axis direction, intervals in the X-axis direction, intervals in the Y-axis direction, and the like of the protruding portion 112, the wiring portion 113, the protruding portion 122, and the wiring portion 123 may be set to optimum values in order to set capacitance of the interdigital portion 170 to a desired value.

The wiring portion 113 extends from the end portion 111A of the element 111 so as to protrude in the positive X-axis direction. The wiring portion 113 is an example of a first wiring portion. The wiring portion 113 has a uniform width (width in the Y-axis direction) from a side connected to the element 111 to a tip of a positive X-axis direction side of the wiring portion 113. The width of the wiring portion 113 is, for example, approximately twice the width of the protruding portion 112.

Since a current flows through the wiring portion 113 during communication of the RFID tag 100, it is preferable to increase the width of the wiring portion 113 in order to reduce a resistance value of the wiring portion 113. Accordingly, in the RFID tag 100 of Embodiment 1, the width of the wiring portion 113 is larger than that of the protruding portion 112. The width of the wiring portion 113 is equal to the width of the wiring portion 123 connected to the wiring portion 113 with the IC chip 130 in between.

The wiring portion 113 is positioned between the three protruding portions 112 and the three protruding portions 112. The wiring portion 113 includes a terminal 113A at a tip and the IC chip 130 is connected to the terminal 113A. As an example, the wiring portion 113 is disposed on a central axis of the antenna element 120 parallel to the X-axis.

As illustrated in FIG. 6, in a state before connecting the IC chip 130, the wiring portion 113 is formed such that a space is provided in the X-axis direction between the wiring portion 113 and a terminal 123A at a tip of the wiring portion 123. One of two terminals of the IC chip 130 is connected to the terminal 113A by solder or the like. Here, although the wiring portion 113 is shorter than the wiring portion 123 and the IC chip 130 is offset toward a negative X-axis direction side in plan view in FIGS. 4A and 4B as an example, the wiring portion 113 may be longer than the wiring portion 123 or may be equal to the wiring portion 123. A position of the IC chip 130 in the X-axis direction is determined according to the lengths of the wiring portion 113 and the wiring portion 123.

The tapered portion 124A1 at a tip of the connection portion 124A of the antenna element 120 is provided on a positive Y-axis direction side of the protruding portion 112 positioned on a most positive side in the Y-axis direction. The connection portion 124A and the tapered portion 124A1 will be described below.

As illustrated in FIG. 5 and FIG. 6, the antenna element 120 is formed within an area of approximately one half in the longitudinal direction of one surface of the sheet portion 105. The antenna element 120 is an example of a second antenna element.

The antenna element 120 includes the element 121, the protruding portion 122, the wiring portion 123, and the connection portion 124A. The antenna element 120 and the antenna element 110 constitute the loop antenna 180.

The antenna element 120 may be made of metal and may be aluminum, copper, or the like. The antenna element 120 may be made by, for example, wet etching together with the antenna element 110. The antenna elements 110 and 120 may be patterned by providing a metal foil such as a copper foil on one surface of the sheet portion 105 and performing wet etching.

The element 121 is a radiation portion in a rectangular shape in plan view. The protruding portion 122, the wiring portion 123, and the connection portion 124A are connected to an end portion 121A of a negative X-axis direction side of the element 121. The element 121 includes the end portion 121B opposite the end portion 121A. The element 121 is an example of a second base portion.

The element 121 is provided in the range from the end portion 121A positioned on an upper surface side of the base portion 101 to the end portion 121B positioned on a bottom surface side of the base portion 101, and is bent at the end portion 101B side of the base portion 101.

The element 121 is overlapped with the element 111 in the end portion 121B.

As illustrated in FIG. 4B, the end portion 121B is overlapped with an end portion 111B of an element 111 on the bottom surface side of the base portion 101 in a state where the inlay 150 is wound around the base portion 101.

A part in which the end portion 121B and the end portion 111B are overlapped with each other in plan view constitutes the overlapped portion 160 and in the overlapped portion 160, the end portion 121B and the end portion 111B are insulated by the sheet portion 105.

As illustrated FIGS. 4A to 6, the protruding portion 122 extends from the end portion 121A of the element 121 so as to protrude in the negative X-axis direction. Two protruding portions 122 are provided on a positive Y-axis direction side with respect to the wiring portion 123 and the three protruding portions 122 are provided on a negative Y-axis direction side with respect to the wiring portion 123. Lengths of five protruding portions 122 in the X-axis direction are all equal to each other. The protruding portion 122 is an example of a second protruding portion. Note that since FIG. 1 to FIG. 3 are illustrated based on a simulation model described below, eleven protruding portions 122 are provided.

Widths (widths in the Y-axis direction) of the five protruding portions 122 are equal to each other and each of the five protruding portions 122 has a uniform width (width in the Y-axis direction) from a side connected to the element 121 to a tip of a negative X-axis direction side of the protruding portion 122. The width of the protruding portion 122 is equal to a width of the protruding portion 112. Five protruding portions 122 and the six protruding portions 112 are arranged alternately in plan view.

The wiring portion 123 extends from the end portion 121A of the element 121 so as to protrude in the negative X-axis direction. The wiring portion 123 is an example of a second wiring portion.

The width (width in the Y-axis direction) of the wiring portion 123 is uniform from a side connected to the element 121 to a tip of a negative X-axis direction side of the protruding portion 123. The width of the wiring portion 123 is equal to the width of the wiring portion 113 and is approximately twice the width of the protruding portion 122.

Since a current flows through the wiring portion 123 during communication of the RFID tag 100, it is preferable to increase the width of the wiring portion 123 in order to reduce a resistance value of the wiring portion 123. Accordingly, in the RFID tag 100 of Embodiment 1, the width of the wiring portion 123 is larger than that of the protruding portion 122.

The wiring portion 123 is positioned between the two protruding portions 122 of a positive Y-axis direction side and the three protruding portions 122 of a negative Y-axis direction side. The terminal 123A is provided at a tip of the wiring portion 123. As illustrated in FIG. 1, the IC chip 130 is connected to the terminal 123A. As an example, the wiring portion 123 is disposed on a central axis of the antenna element 120 parallel to the X-axis.

As illustrated in FIG. 6, in a state before connecting the IC chip 130, the wiring portion 123 is formed such that a space is provided in the X-axis direction between the wiring portion 123 and the terminal 113A at a tip of the wiring portion 113. The other of the two terminals of the IC chip 130 is connected to the terminal 123A by solder or the like.

The wiring portion 123, the protruding portion 122, the protruding portion 112, and the wiring portion 113 constitute the interdigital portion 170.

The connection portion 124A is disposed on a positive Y-axis direction side than the protruding portion 112 disposed on a most positive side in the Y-axis direction, and on a positive Y-axis direction side of the protruding portion 122 disposed on a most positive side in the Y-axis direction.

The connection portion 124A extends from the end portion 121A of the element 121 so as to protrude in the negative X-axis direction and includes the tapered portion 124A1 at a tip. A width in the Y-axis direction at an end portion of a positive X-axis direction side of the tapered portion 124A1 is equal to a width of the connection portion 124A other than the tapered portion 124A1. The tapered portion 124A1 has a tapered shape in which a width in the Y axis direction becomes narrow toward a tip on a negative X-axis direction side. The tip on a negative X-axis direction side of the tapered portion 124A1 is connected to the element 111 of the antenna element 110.

In a case where the antenna elements 110 and 120 are patterned by the wet etching, as an amount of etching increases, the widths of the protruding portions 112, the wiring portion 113, the five protruding portions 122, the wiring portion 123, and the connection portion 124A become narrow. When the widths of the protruding portions 112, the wiring portion 113, the five protruding portions 122, the wiring portion 123, and the connection portion 124A become narrow, a capacitance value of the interdigital portion 170 is decreased.

When the capacitance value of the interdigital portion 170 is decreased, the resonance frequency of the RFID tag 100 is shifted to a high frequency side. Since a frequency bandwidth which the RFID tag 100 may use is determined for each country or region in which the RFID tag 100 is used, if the resonance frequency of the RFID tag 100 deviates from a predetermined frequency band, there is a possibility that the RFID tag 100 may not be used.

Therefore, the RFID tag 100 includes the connection portion 124A having the tapered portion 124A1. When the amount of etching is within a range between a design value and a value obtained by adding a certain allowable value to the design value, the tapered portion 124A1 is connected to the element 111 of the antenna element 110. When the amount of etching exceeds the value obtained by adding the certain allowable value to the design value, a tip of the tapered portion 124A1 is separated from the element 111.

The amount of etching is determined by the etching rate and a period of time for performing etching and is the amount to remove metal foil or the like. In addition, the design value of the amount of etching is the amount of etching which realizes the design value of the antenna elements 110 and 120. As an example, the design values of the antenna elements 110 and 120 are values in the case where the RFID tag 100 includes the connection portion 124A having the tapered portion 124A1 of an ideally designed shape.

When the tapered portion 124A1 is separated from the element 111, since a capacitor is constituted between the protruding portion 112 disposed on a most positive side in the Y-axis direction and the connection portion 124A, capacitance of the interdigital portion 170 is increased.

When the capacitance of the interdigital portion 170 is increased, it is possible to reduce the resonance frequency of the RFID tag 100.

The RFID tag 100 includes the connection portion 124A having the tapered portion 124A1, so that even if variation of the amount of etching occurs in the wet etching, the resonance frequency of the RFID tag 100 is within a certain range. When the certain range is set so as to be within a frequency bandwidth determined for each country or region in which the RFID tag 100 is used, even if variation of the amount of etching occurs, it is possible to manufacture the RFID tag 100 capable of communicating at a predetermined frequency bandwidth.

Accordingly, the RFID tag 100 includes the connection portion 124A having the tapered portion 124A1.

Furthermore, intervals between adjacent two of the six protruding portions 112, the wiring portion 113, the five protruding portions 122, the wiring portion 123, and the connection portion 124A in the Y-axis direction are, for example, all equal to each other.

The IC chip 130 includes two terminals 131 and 132 and is mounted on a surface of the sheet portion 105. The two terminals 131 and 132 of the IC chip 130 are respectively connected to the terminals 113A and 123A by solder or the like. The IC chip 130 is electrically connected to the antenna elements 110 and 120. Data representing a unique ID is stored in a memory chip inside of the IC chip 130.

When the IC chip 130 receives a signal for reading a radio frequency (RF) bandwidth from a reader/writer for the RFID tag 100 through the antenna elements 110 and 120, the IC chip 130 operates by a power of the received signal and transmits the data representing the ID through the antenna elements 110 and 120. As a result, it is possible to read the ID of the RFID tag 100 by the reader/writer.

The overlapped portion 160 is the part in which the end portion 111B of the antenna element 110 and the end portion 121B of the antenna element 120 are overlapped with each other. A current with a high frequency of 892 MHz flows through the antenna elements 110 and 120. The overlapped portion 160 is connected in an AC manner and the antenna elements 110 and 120 constitute the loop antenna 180.

In addition, the overlapped portion 160 may be used for modulating the resonance frequency of the RFID tag 100. Capacitance of the overlapped portion 160 is determined by an area in which the end portions 111B and 121B are overlapped with each other and an interval between the end portions 111B and 121B.

In addition, the overlapped portion 160 includes a part in which the overlapped portion 160 and the interdigital portion 170 are overlapped with each other. With this, since the overlapped portion 160 and the interdigital portion 170 are overlapped with each other in the Z-axis direction, it is also possible to secure capacitance between the overlapped portion 160 and the interdigital portion 170. It is possible to adjust the resonance frequency of the RFID tag 100 also by adjusting capacitance related to the overlapped portion 160.

The interdigital portion 170 is composed by alternately arranging in plan view the protruding portions 112, the wiring portion 113, the protruding portions 122, and the wiring portion 123.

The interdigital portion 170 is provided to adjust the resonance frequency of the loop antenna 180 of the RFID tag 100 by saving capacitance generated by arranging the protruding portion s112, the wiring portion 113, the protruding portions 122, and the wiring portion 123 close to each other.

The interdigital portion 170 is formed over the antenna elements 110 and 120. Furthermore, in a case where a tip of the tapered portion 124A1 of the connection portion 124A is separated from the element 111, the connection portion 124A is also included in the interdigital portion 170.

Figure 7:
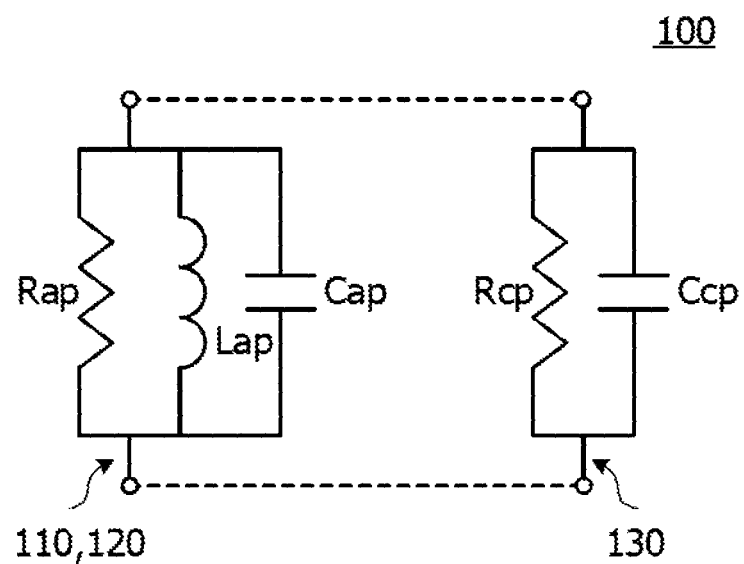
FIG. 7 is a diagram illustrating an equivalent circuit of the RFID tag.

FIG. 7 is a diagram illustrating an equivalent circuit of the RFID tag 100.

The loop antenna 180 constituted by the antenna elements 110 and 120 may be represented by a resistor Rap and an inductor Lap. In the RFID tag 100 of the present embodiment, since the overlapped portion 160 and the interdigital portion 170 are provided in the loop antenna 180, a capacitor Cap is connected in parallel to the resistor Rap and the inductor Lap in FIG. 7. The capacitor Cap is a combination of the overlapped portion 160 and the interdigital portion 170 and is represented as one capacitor.

Furthermore, the antenna elements 110 and 120 include a loop having the wiring portions 113 and 123, the elements 111 and 121, and the connection portion 124A, but the loop is shorter than the loop antenna 180 and inductance of the loop is larger than that of the loop antenna 180. Accordingly, inductance of the loop antenna 180 occupies most of total inductance of the loop antenna 180 and the loop having the wiring portions 113 and 123, the elements 111 and 121, and the connection portion 124A.

In the embodiment, the antenna elements 110 and 120 are designed so that inductance of the loop having the wiring portions 113 and 123, the elements 111 and 121, and the connection portion 124A is sufficiently larger than inductance of the loop antenna 180.

In addition, the IC chip 130 of the RFID tag 100 is represented by a resistor Rcp and a capacitor Ccp.

That is, the loop antenna 180 includes a resistance component and an inductance component, and a capacitance component is connected to the loop antenna 180. The IC chip 130 may be represented by a resistance component and a capacitance component.

Here, the resistor Rap is a resistor of a resistance value Rap, the inductor Lap is an inductor of inductance Lap, and the capacitor Cap is a capacitor of capacitance Cap. In addition, the resistor Rcp is a resistor of a resistance value Rcp and the capacitor Ccp is a capacitor of capacitance Ccp.

For example, the Rcp is 2000Ω and the Ccp is approximately 1.0 pF. This is an average value obtained in a typical IC chip.

The RFID tag 100 performs communication by generating resonance in the equivalent circuit illustrated in FIG. 7. That is, when the RFID tag 100 receives a signal for reading and transmits data representing the ID, a current due to resonance flows through the IC chip 130 and the antenna elements 110 and 120.

The resonance frequency of the resonance current is mainly determined by capacitance of the IC chip 130, inductance of the antenna elements 110 and 120, capacitance of the overlapped portion 160, and capacitance of the interdigital portion 170.

Here, the resonance frequency of the RFID tag 100 may be obtained by expression (1).

$$f0 = \frac{1}{2\pi\sqrt{Lap(Ccp + Cap)}} \quad (1)$$

In the expression (1), Lap is the inductance Lap of the antenna elements 110 and 120, Ccp is the capacitance Ccp of the IC chip 130, and Cap is the capacitance Cap of the overlapped portion 160 and the interdigital portion 170.

With this, the resonance frequency of the RFID tag 100 is not determined only by the loop antenna 180 (antenna elements 110 and 120), but by the loop antenna 180 (antenna elements 110 and 120), the overlapped portion 160, the interdigital portion 170, and the IC chip 130.

At this point, the loop antenna 180 included in the RFID tag 100 is different from a so-called loop antenna generating resonance by setting a loop length of the loop antenna to a length of one wavelength at the resonance frequency.

The resonance frequency of the resonance current in the RFID tag 100 of the present embodiment is a frequency (communication frequency) at which the RFID tag 100 performs communication and is set to, for example, 892 MHz. A loop length of the loop antenna 180 constituted by the antenna elements 110 and 120 is approximately 65 mm and is set to be shorter than a wavelength at the resonance frequency.

As an example, in a case where a resonance frequency is 892 MHz, a wavelength at the resonance frequency is 336.1 mm and a loop length of the loop antenna 180 of the RFID tag 100 is approximately 65 mm.

With this, since the loop length of the loop antenna 180 is shorter than the length of one wavelength at the resonance frequency, unlike a so-called loop antenna in which the loop length is set to one wavelength at the resonance frequency, the antenna elements 110 and 120 constituting the loop antenna 180 function as an inductor.

However, since a combined length (loop length) of the antenna elements 110 and 120 is relatively short as described above and inductance of the antenna elements 110 and 120 is proportional to a length of the antenna elements 110 and 120, inductance of the loop antenna 180 is relatively small. Therefore, in the RFID tag 100, in order to compensate for small inductance, the resonance frequency is adjusted by providing the loop antenna 180 with the overlapped portion 160 and the interdigital portion 170.

Impedance of an antenna obtained by adding the overlapped portion 160 and the interdigital portion 170 to the loop antenna 180 constituted by the antenna elements 110 and 120 is determined by a resistance value (Rap) of the resistor Rap, inductance (Lap) of the inductor Lap, and capacitance (Cap) of the capacitor Cap illustrated in FIG. 7.

In addition, impedance of the IC chip 130 is determined by a resistance value (Rcp) of the resistor Rcp and the capacitance (Ccp) of the capacitor Ccp.

In order to obtain appropriate impedance matching between the loop antenna 180 and the IC chip 130, the resistance value Rap and the resistance value Rcp may be adjusted in addition to adjustment of the inductance Lap, the capacitance Cap, and the capacitance Ccp.

Next, the RFID tag 100 in which the amount of etching is large when patterning the antenna elements 110 and 120 and the tapered portion 124A1 is separated from the element 111 will be described.

Figure 8A:
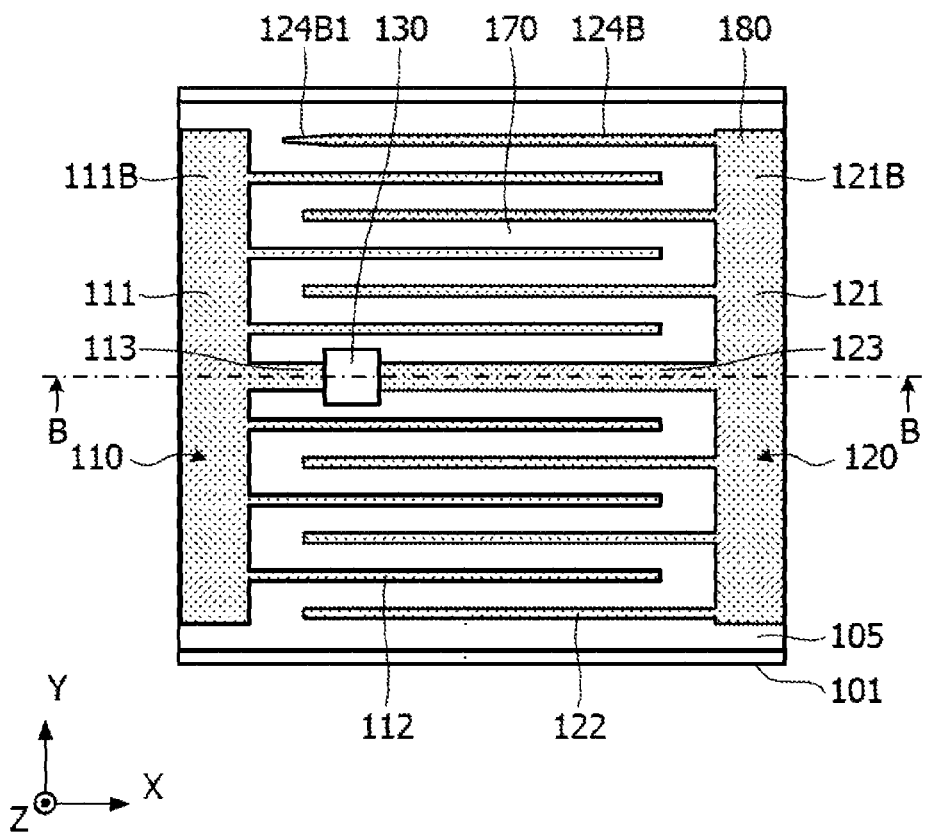
FIGS. 8A and 8B are diagrams illustrating the RFID tag in which a tapered portion is separated from the element.
Figure 8B:
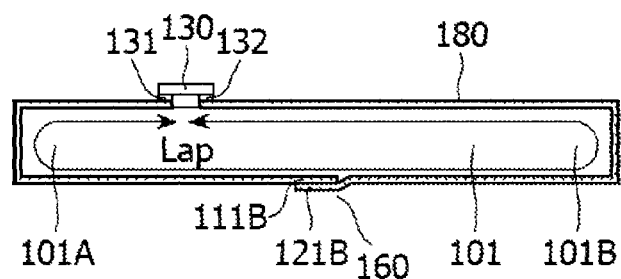

FIGS. 8A and 8B are diagrams illustrating the RFID tag 100 in which the tapered portion 124A1 is separated from the element 111. FIGS. 8A and 8B correspond to FIGS. 4A and 4B and illustrate a configuration in which the cover portion 140 is removed from the RFID tag 100. FIG. 8A illustrates a configuration in plan view and FIG. 8B illustrates a cross section taken along a line VIIIB-VIIIB in FIG. 8A.

In FIG. 8A, since the amount of etching is larger than in a case of patterning the tapered portion 124A1 illustrated in FIG. 4A, a tapered portion 124B1 is separated from the element 111. Accordingly, the connection portion 124A illustrated in FIG. 4A is a protruding portion 124B and the tapered portion 124B1 is provided at a tip of the protruding portion 124B. The protruding portion 124B is an example of a third protruding portion.

In addition, since the amount of etching is larger than in the case illustrated in FIG. 4A, protruding portions 112 and 122 and wiring portions 113 and 123 become narrower than in FIG. 4A.

When the protruding portions 112 and 122 and the wiring portions 113 and 123 become narrow, an interval between the protruding portions 112 and 122 and the wiring portions 113 and 123 increases, so that capacitance obtained between the protruding portions 112 and 122 and the wiring portions 113 and 123 is decreased.

However, since the protruding portion 124B is added to the interdigital portion 170, combined capacitance Cap1 of the overlapped portion 160 and the interdigital portion 170 is lower than capacitance Cap immediately before the tapered portion 124A1 is separated from the element 111.

In the embodiment, the antenna elements 110 and 120 is designed so that combined capacitance Cap1 of the overlapped portion 160 and the interdigital portion 170 in a state immediately after the tapered portion 124A1 is separated from the element 111 is set to be equal to capacitance Cap in a case where the amount of etching is a design value.

Here, the state immediately after the tapered portion 124A1 is separated from the element 111 is a state where the amount of etching is increased and the tapered portion 124A1 is separated from the element 111 and the etching has not progressed as compared with a state where the connection portion 124A is changed to the protruding portion 124B.

Furthermore, since the elements 111 and 121 and the wiring portions 113 and 123 have a sufficient thickness even though the amount of etching is larger than in the case illustrated in FIG. 4A, the resistance value Rap and the inductance Lap of the loop antenna 180 are substantially unchanged.

Figure 9:
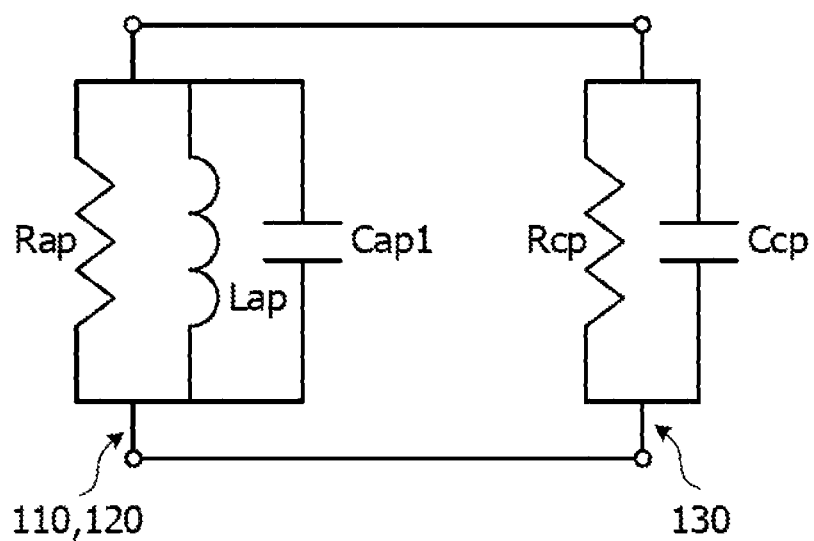
FIG. 9 is a diagram illustrating an equivalent circuit of the RFID tag immediately after the tapered portion is separated from the element.

FIG. 9 is a diagram illustrating an equivalent circuit of the RFID tag 100 immediately after the tapered portion 124A1 is separated from the element 111.

Capacitance Cap of the antenna elements 110 and 120 is changed to the capacitance Cap1 compared to the diagram of the equivalent circuit of FIG. 7. The capacitance Cap1 is combined capacitance Cap1 of the overlapped portion 160 and the interdigital portion 170 in a state where the tapered portion 124A1 is separated from the element 111.

In addition, since a resistance value Rap and inductance Lap of the loop antenna 180 are substantially unchanged, the resistance value Rap and the inductance Lap are maintained.

Accordingly, a resonance frequency f0 of the RFID tag 100 immediately after the tapered portion 124A1 is separated from the element 111 is obtained by expression (2).

$$f0 = \frac{1}{2\pi\sqrt{Lap(Ccp + Cap1)}} \quad (2)$$

In the expression (2), since capacitance Cap1 in the RFID tag 100 immediately after the tapered portion 124A1 is separated from the element 111 is equal to capacitance Cap in a case where the amount of etching is a design value, a resonance frequency f0 expressed by the expression (2) is equal to a resonance frequency f0 expressed by the expression (1).

Figure 10:
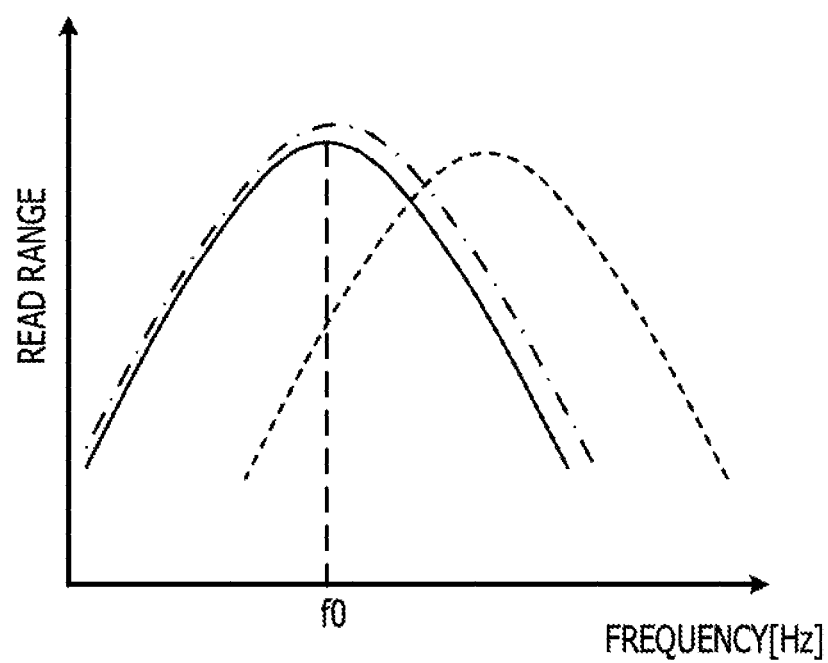
FIG. 10 is a diagram illustrating frequency characteristics regarding a reading distance of the RFID tag.

FIG. 10 is a diagram illustrating frequency characteristics regarding a reading distance of the RFID tag 100. In FIG. 10, a horizontal axis illustrates a frequency when reading the RFID tag 100 with a reader/writer and a vertical axis illustrates a maximum value (Read Range) which the reader/writer may read. The frequency characteristics regarding the reading distance illustrated in FIG. 10 is obtained by an electromagnetic field simulation.

The characteristic indicated by a solid line is the design value and a resonance frequency f0 at which the reading distance becomes the maximum is set to 892 MHz.

The characteristic indicated by an one-dot chain line is a characteristic obtained by the RFID tag 100 immediately after the tapered portion 124A1 is separated from the element 111, and a resonance frequency at which the reading distance becomes the maximum is a value which is approximately equal to the resonance frequency f0 of the characteristic indicated by the solid line.

The characteristic indicated by a broken line is a characteristic indicated for comparison and is a characteristic obtained in a case where the amount of etching of the RFID tag 100 not including the connection portion 124A is an amount of predetermined over etching. Here, the amount of etching of predetermined over etching is more than an amount of etching by which the tapered portion 124A1 is separated.

The resonance frequency at which the reading distance is maximum in the characteristic indicated by the broken line is greatly deviated from the resonance frequency f0 of the characteristic indicated by the solid line. If the resonance frequency largely deviates in this manner, the readable distance at the resonance frequency f0 is greatly shortened, and there is a possibility that the RFID tag 100 may not be used as an RFID tag.

In the wet etching, there is a case where the amount of etching varies due to distribution of concentration of etching solution. Specifically, there is a case where variation may occur in the amount of etching between a plurality of the antenna elements 110 and 120 when simultaneously patterning the plurality of the antenna elements 110 and 120 of the element 150A before the element 150A (see FIG. 6) is made into a chip.

The RFID tag 100 of the embodiment includes the connection portion 124A of the design value in order to suppress such individual difference due to variation of the amount of etching.

Before the wet etching for patterning the antenna elements 110 and 120 is performed, a mask used when exposing a resist by photolithography is opened according to a shape of the antenna elements 110 and 120. That is, the mask includes an opening corresponding to the connection portion 124A.

Figure 11:
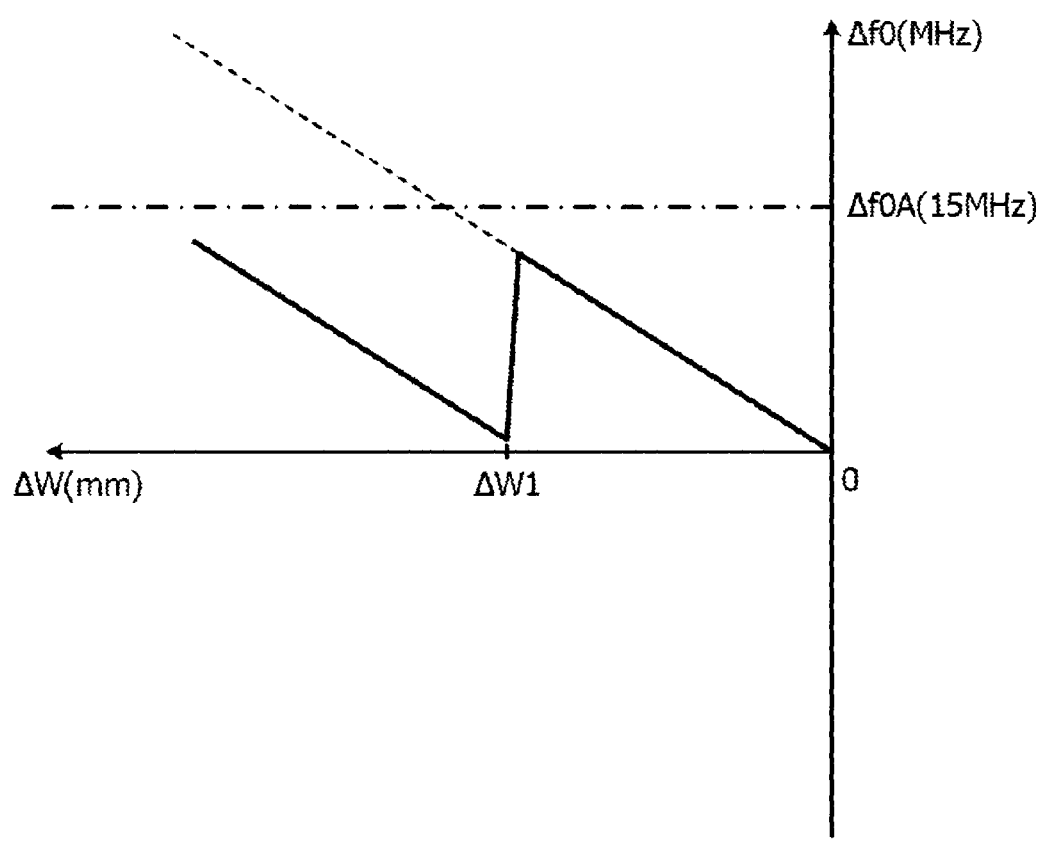
FIG. 11 is a characteristic diagram illustrating a relationship between an amount of etching and an amount of variation of a resonance frequency.

FIG. 11 is a characteristic diagram illustrating a relationship between an amount of etching and an amount of variation of a resonance frequency. In FIG. 11, a horizontal axis illustrates an amount of variation $\Delta W$ (mm) with respect to a design value of the amount of etching. It may be seen that an amount of etching is a design value in that a value on a horizontal axis is 0 (right end) and the amount of variation $\Delta W$ of the amount of etching increases (becomes overetching) as moved to the left.

Here, the amount of variation $\Delta W$ has the largest influence on widths of the protruding portions 112 and 122 and the wiring portions 113 and 123 in the Y-axis direction. Accordingly, as the horizontal axis is moved to the left, the widths of the protruding portions 112 and 122 and the wiring portions 113 and 123 become narrow.

Furthermore, here, as an example, a case is considered where the amount of variation $\Delta W$ of the amount of etching is larger than the design value with reference to a case where the amount of etching is the design value. In addition, in a case where the amount of variation $\Delta W$ is negative, since the amount of etching is not sufficient for the design value and the antenna elements 110 and 120 are incomplete, the case where the amount of variation $\Delta W$ is negative is not considered.

A vertical axis of FIG. 11 illustrates an amount of variation $\Delta f0$ (MHz) with respect to a design value of a resonance frequency f0. The amount of variation $\Delta f0$ is 0 when the resonance frequency f0 is the design value. In addition, when the amount of etching increases (becomes over-etching) than the design value, since capacitance of the interdigital portion 170 decreases and the resonance frequency increases, the amount of variation $\Delta f0$ is equal to or more than 0.

In addition, a vertical axis of FIG. 11 illustrates an allowable value $\Delta f0A$ of the amount of variation $\Delta f0$. The allowable value $\Delta f0A$ is approximately 15 MHz, for example.

As illustrated in FIG. 11, when the amount of variation $\Delta W$ of the amount of etching increases, the amount of variation $\Delta f0$ of the resonance frequency f0 increases. This is because capacitance of the interdigital portion 170 decreases and the resonance frequency increases.

When the amount of variation $\Delta W$ of the amount of etching becomes $\Delta W1$, the tapered portion 124A1 at a tip of the connection portion 124A is separated from the element 111 and the protruding portion 124B appears. When the protruding portion 124B appears, since capacitance between the protruding portion 112 on a most positive side in the Y-axis direction and the protruding portion 124B is added to the interdigital portion 170, capacitance of the interdigital portion 170 increases and the resonance frequency decreases. Accordingly, when the amount of variation $\Delta W$ of the amount of etching becomes $\Delta W1$, the amount of variation $\Delta f0$ of the resonance frequency f0 becomes approximately 0.

Furthermore, immediately before the amount of variation $\Delta W$ of the amount of etching reaches $\Delta W1$, the amount of variation $\Delta f0$ of the resonance frequency f0 does not reach the allowable value $\Delta f0A$. This may be realized, for example, by setting a width of the tapered portion 124A1.

Since the amount of variation $\Delta f0$ increases again in an area in which the amount of variation $\Delta W$ of the amount of etching exceeds $\Delta W1$, it is possible to use an area until the amount of variation $\Delta f0$ reaches the allowable value $\Delta f0A$ with respect to the amount of etching.

Figure 12:
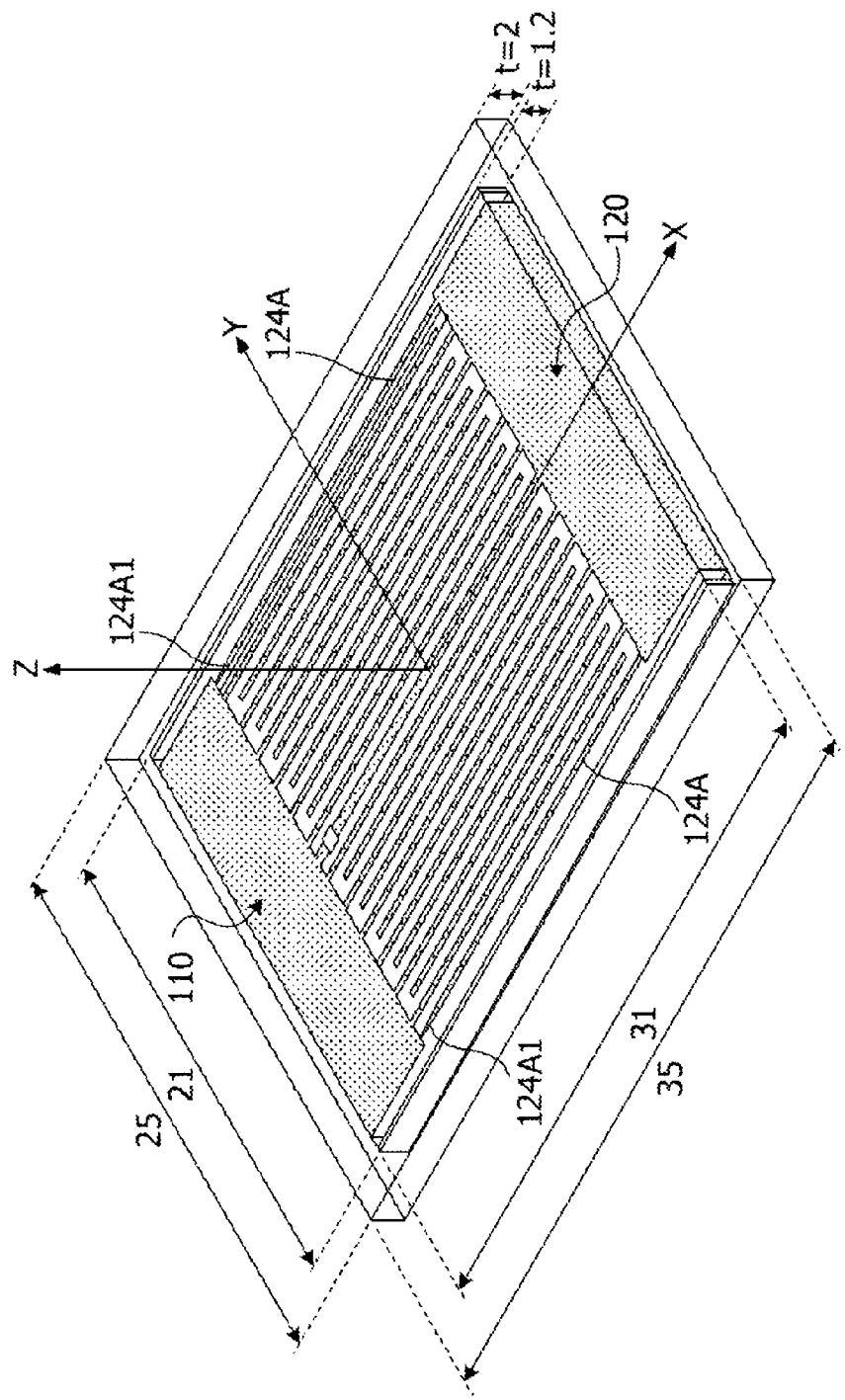
FIG. 12 is a diagram illustrating a simulation model of the RFID tag.

FIG. 12 is a diagram illustrating a simulation model of the RFID tag 100. The simulation model of the RFID tag 100 illustrated in FIG. 12 includes two connection portions 124A. More specifically, the simulation model is configured to have the connection portion 124A instead of the protruding portion 122 positioned on a most negative direction side in the Y-axis direction of the RFID tag 100 illustrated in FIGS. 1 to 6.

Accordingly, in the simulation model of the RFID tag 100, an antenna element 110 includes an element 111, six protruding portions 112, and a wiring portion 113, and the antenna element 120 includes an element 121, four protruding portions 122, a wiring portion 123, and the two connection portions 124A. A tapered portion 124A1 is provided at each of tips of the two connection portion 124A. Sizes of the two tapered portions 124A1 are the same.

In addition, in the simulation model of the RFID tag 100, a length of a loop antenna 180 in the X-axis direction is approximately 31 mm, a width of the loop antenna 180 in the Y-axis direction is approximately 21 mm, and a height of the loop antenna 180 in the Z-axis direction is approximately 1.2 mm.

An interdigital portion 170 includes the twelve protruding portions 112 and the twelve protruding portions 122. In addition, a width of the protruding portions 112 and 122 and the connection portion 124A is set to 0.2 mm and an interval in the Y-axis direction between the protruding portion 112, the wiring portion 113, the protruding portion 122, and the connection portion 124A is set to 0.62 mm.

A cover portion 140 is made of a flame retardant resin, a relative permittivity of the flame retardant resin is 3.2, a dielectric loss tangent tan $\delta$ is 0.02, a length in the X-axis direction is approximately 35 mm, a width in the Y-axis direction is approximately 25 mm, and a thickness in the Z-axis direction is approximately 2 mm.

Under such a condition of this simulation, resonance frequency characteristics regarding a reading distance in a case where an amount of variation $\Delta W$ with respect to a design value of the amount of etching is 0 mm, a case where the amount of variation $\Delta W$ is 0.01 mm, and a case where the amount of variation $\Delta W$ is 0.02 mm are obtained. Widths W of the protruding portions 112, the wiring portion 113, the protruding portions 122, the wiring portion 123, and the connection portions 124A are respectively 0.2 mm, 0.19 mm, and 0.18 mm when each of the amount of variation $\Delta W$ is 0 mm, 0.01 mm, and 0.02 mm.

In a case where the amount of variation $\Delta W$ is 0 mm and a case where the amount of variation $\Delta W$ is 0.01 mm, the tapered portion 124A1 is connected to the element 111. In a case where the amount of variation ΔW is 0.02 mm, the tapered portion 124A1 is separated from the element 111 and a protruding portion 124B appears. These are the same for the two connection portions 124A.

Figure 13:
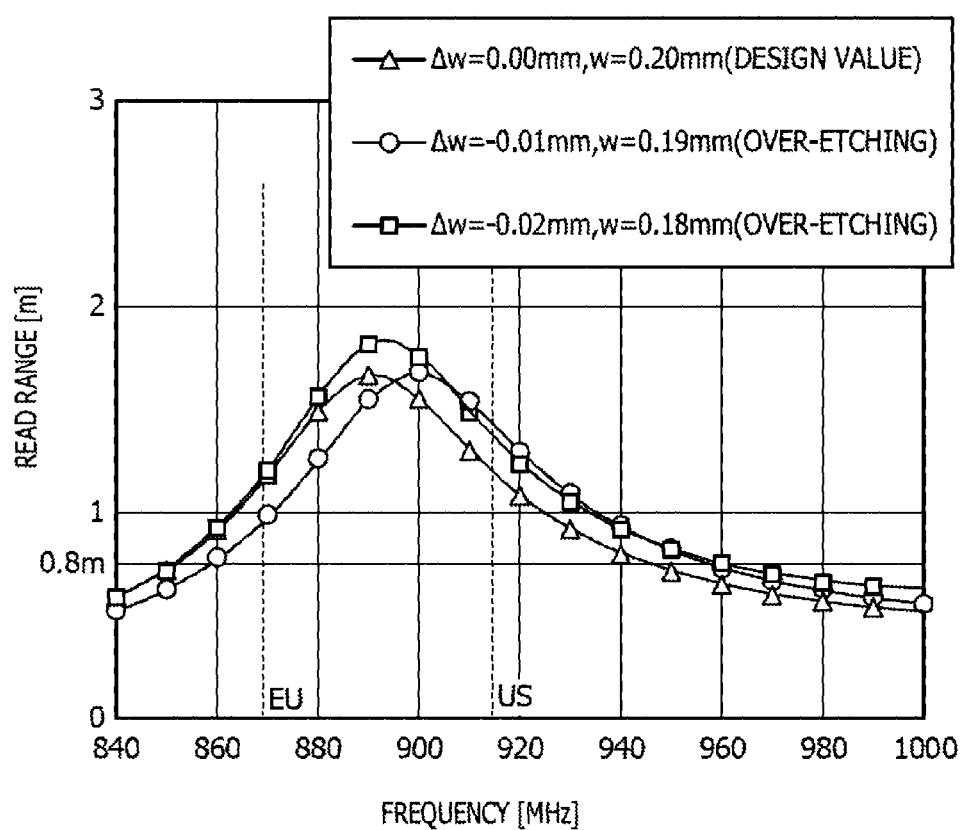
FIG. 13 is a diagram illustrating a result of a simulation of resonance frequency characteristics regarding the reading distance.

FIG. 13 is a diagram illustrating a result of a simulation of resonance frequency characteristics regarding the reading distance. In FIG. 13, a triangular marker illustrates a case where an amount of variation ΔW is 0 mm and a width W is 0.2 mm. This case is a case of a design value and a case where the tapered portion 124A1 is connected to the element 111.

A circle marker illustrates a case where the amount of variation ΔW is 0.01 mm, the width W is 0.19 mm, and the tapered portion 124A1 is connected to the element 111. A square marker illustrates a case where the amount of variation ΔW is 0.02 mm, the width W is 0.18 mm, the tapered portion 124A1 is separated from the element 111, and the protruding portion 124B appears.

In addition, the resonance frequency at the design value is 892 MHz, which is one of communication frequencies of RFID tags in Japan. A horizontal axis illustrates a communication frequency in European Union (EU) and USA (US). A communication frequency bandwidth of EU is 865 MHz to 868 MHz and a communication frequency bandwidth of US is 902 MHz to 928 MHz. As an example, such frequency bandwidth is provided to verify how much the reading distance may be obtained in the RFID tag 100 of which resonance frequency is adjusted for domestic use at the communication frequencies of EU and US.

In addition, a lower limit of the reading distance illustrated by a vertical axis is set to 0.8 m.

As a result of the simulation, in a case of the design value (triangular marker), the resonance frequency is 892 MHz and the reading distance at 892 MHz is approximately 1.7 m. In addition, in a case where the amount of variation ΔW is approximately 0.01 mm and the width W is 0.19 mm (circle marker), the resonance frequency is 900 MHz and the reading distance at 892 MHz is approximately 1.6 m. In addition, in a case where the amount of variation ΔW is approximately 0.02 mm and the width W is 0.18 mm (square marker), the resonance frequency is 893 MHz and the reading distance at 892 MHz is approximately 1.8 m.

In addition, in either case, the reading distance exceeds 0.8 m in the communication frequency bandwidth (865 MHz to 868 MHz) of EU and the communication frequency (902 MHz to 928 MHz) of US, and it is confirmed that one RFID tag 100 of the design value may correspond to three destinations.

From above results, it is understood that even if over-etching of 0.01 mm occurs, deviation of the resonance frequency is 8 MHz, which is within an allowable range, and a sufficient reading distance may be obtained. In addition, it is understood that if over-etching of 0.02 mm occurs, deviation of the resonance frequency is approximately 1 MHz in the RFID tag 100 in which the protruding portion 124B appears and which is the same as the design value, and the sufficient reading distance may be obtained.

Figure 14:
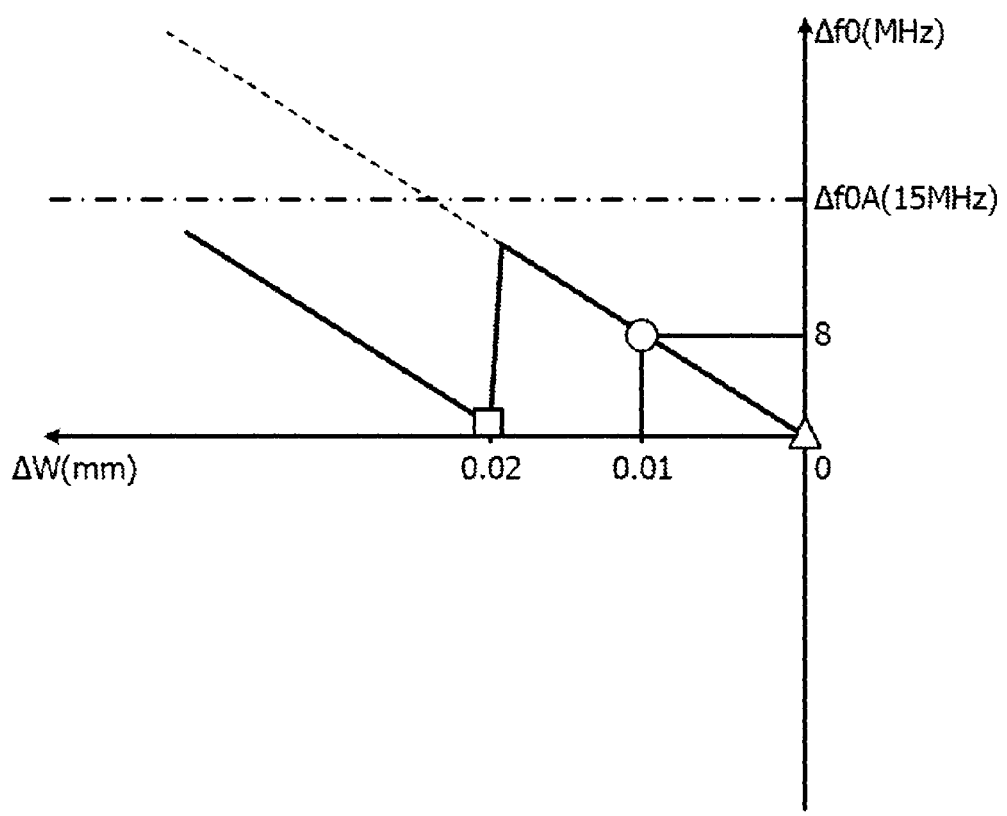
FIG. 14 is a characteristic diagram illustrating a relationship between an amount of etching and an amount of variation of the resonance frequency.

FIG. 14 is a characteristic diagram illustrating a relationship between an amount of etching and an amount of variation of a resonance frequency. The characteristic diagram illustrated in FIG. 14 is made based on the result of the simulation illustrated in FIG. 13.

In FIG. 14, a horizontal axis illustrates an amount of variation ΔW with respect to a design value of the amount of etching and a vertical axis illustrates an amount of variation Δf0 with respect to a design value of a resonance frequency f0. These are the same as FIG. 11.

In addition, in the same manner as FIG. 13, a triangular marker illustrates a case of the design value, a circle marker illustrates a case where the amount of variation ΔW is 0.01 mm, a width W is 0.19 mm, and a square marker illustrates a case where the amount of variation ΔW is 0.02 mm, the width W is 0.18 mm.

When the amount of variation ΔW of the amount of etching increases from zero (0) and reaches 0.01 mm, the amount of variation Δf0 of the resonance frequency f0 reaches 8 MHz. In addition, immediately before the amount of variation ΔW of the amount of etching further increases and reaches 0.02 mm, the amount of variation Δf0 of the resonance frequency f0 reaches approximately 12 MHz. This value is a value equal to or less than an allowable value Δf0A (15 MHz).

When the amount of variation ΔW of the amount of etching reaches 0.02 mm, the tapered portion 124A1 at a tip of the connection portion 124A is separated from the element 111 and the protruding portion 124B appears, capacitance of the interdigital portion 170 increases, the resonance frequency decreases, and the amount of variation Δf0 of the resonance frequency f0 becomes approximately 1 MHz.

When the amount of variation ΔW of the amount of etching further increases, the amount of variation Δf0 of the resonance frequency f0 increases again. Even if the amount of variation ΔW of the amount of etching is equal to or more than 0.02 mm, it is possible to use an area until the amount of variation Δf0 reaches the allowable value Δf0A.

As described above, in the RFID tag 100 of the embodiment, even if the resonance frequency increases as the amount of variation ΔW of the amount of etching increases, when the amount of variation ΔW reaches a certain value, capacitance of the interdigital portion 170 increases by the connection portion 124A being changed to the protruding portion 124B. As a result, the resonance frequency decreases to a value close to the design value.

Thus, even if the amount of etching increases exceeding the design value (over-etching), the amount of variation Δf0 is within the certain range.

Accordingly, if a relationship between the tapered portion 124A1 and an etching rate is designed so that a maximum value of the amount of variation Δf0 is equal to or less than the allowable value Δf0A, it is possible to provide the RFID tag 100 capable of performing an appropriate operation at a desired communication frequency even if the antenna elements 110 and 120 are patterned in the wet etching.

Specifically, there is a case where variation may occur in the amount of etching between a plurality of the antenna elements 110 and 120 when simultaneously patterning the plurality of the antenna elements 110 and 120 of the element 150A (see FIG. 6). The element 150A having a small amount of etching may include the connection portion 124A and the element 150A having a large amount of etching may include the protruding portion 124B.

In this case, if the relationship between the tapered portion 124A1 and the etching rate is designed so that the maximum value of the amount of variation Δf0 is equal to or less than the allowable value Δf0A, it is possible to manufacture the element 150A including the connection portion 124A and the element 150A including the protruding portion 124B even if the antenna elements 110 and 120 are patterned in the wet etching.

Both of the RFID tag 100 manufactured using the element 150A including the connection portion 124A and the RFID tag 100 manufactured using the element 150A including the protruding portion 124B have an amount of variation Δf0 equal to or less than the allowable value Δf0A and may communicate at a desired communication frequency bandwidth.

Accordingly, even if variation occurs in the amount of etching, a plurality of RFID tags 100 in which a plurality of elements 150A simultaneously manufactured in the wet etching are made into chips may perform an appropriate operation.

As described above, according to the embodiment, it is possible to provide the RFID tag 100 capable of performing an appropriate operation at a desired communication frequency.

In above descriptions, the antenna elements 110 and 120 are provided on a surface of the sheet portion 105 and the loop antenna 180 is constituted by winding the sheet portion 105 around the base portion 101.

However, instead of using the base portion 101 and the sheet portion 105, following descriptions may be used. For example, in addition to providing a part illustrated in FIG. 4A among the elements 111 and 121, that is, the protruding portions 112 and 122, the wiring portions 113 and 123, and the connection portion 124A on the upper surface of the wiring substrate, a metal foil is provided on a lower surface of a wiring substrate and a via hole penetrating through the wiring substrate in the thickness direction is provided, so that the elements 111 and 121 of an upper surface of the wiring substrate may be connected to the metal foil on the lower surface via the wiring substrate.

In this way, it is possible to constitute a loop antenna in the same manner as a case where the antenna elements 110 and 120 are provided on the surface of the sheet portion 105 and the sheet portion 105 is wound around the base portion 101.

In addition, instead of the via hole, a plating layer may be provided on a side surface of the wiring substrate to connect the elements 111 and 121 on the upper surface of the wiring substrate and the metal foil on the lower surface.

In addition, in the above descriptions, a width of the tapered portion 124A1 provided at a tip of the connection portion 124A becomes narrow toward the element 111. However, the width of the tapered portion 124A1 may be equal to a width of the connection portion 124A on the element 111 side and may be thinner toward the connection portion 124A. That is, a tapered shape illustrated in FIGS. 4A to 6 and the like may be reversed in the X-axis direction. In addition, a shape of the tapered portion 124A1 may be any shape as long as the shape of the tapered portion 124A1 is a tapered shape in plan view.

In addition, in the above descriptions, although the tapered portion 124A1 is provided at the tip of the connection portion 124A, the connection portion 124A may include a section (narrow section) having a width narrower than a width of the connection portion 124A instead of the tapered portion 124A1. This narrow section may be provided at any portion in the connection portion 124A in the X-axis direction.

If this narrow section is used, as in a case of using the tapered portion 124A1, when an amount of variation ΔW of the amount of etching exceeds a predetermined amount, the connection portion 124A is separated and a capacitance value of the interdigital portion 170 may be increased.

In addition, in the above descriptions, the RFID tag 100 includes the one connection portion 124A. As only one exception, the RFID tag 100 of the simulation model illustrated in FIG. 12 includes the two connection portion 124A, but sizes of the two tapered portion 124A1 are the same.

The RFID tag 100 may include the connection portion 124A having a plurality of tapered portions 124A1 with different sizes.

Figure 15:
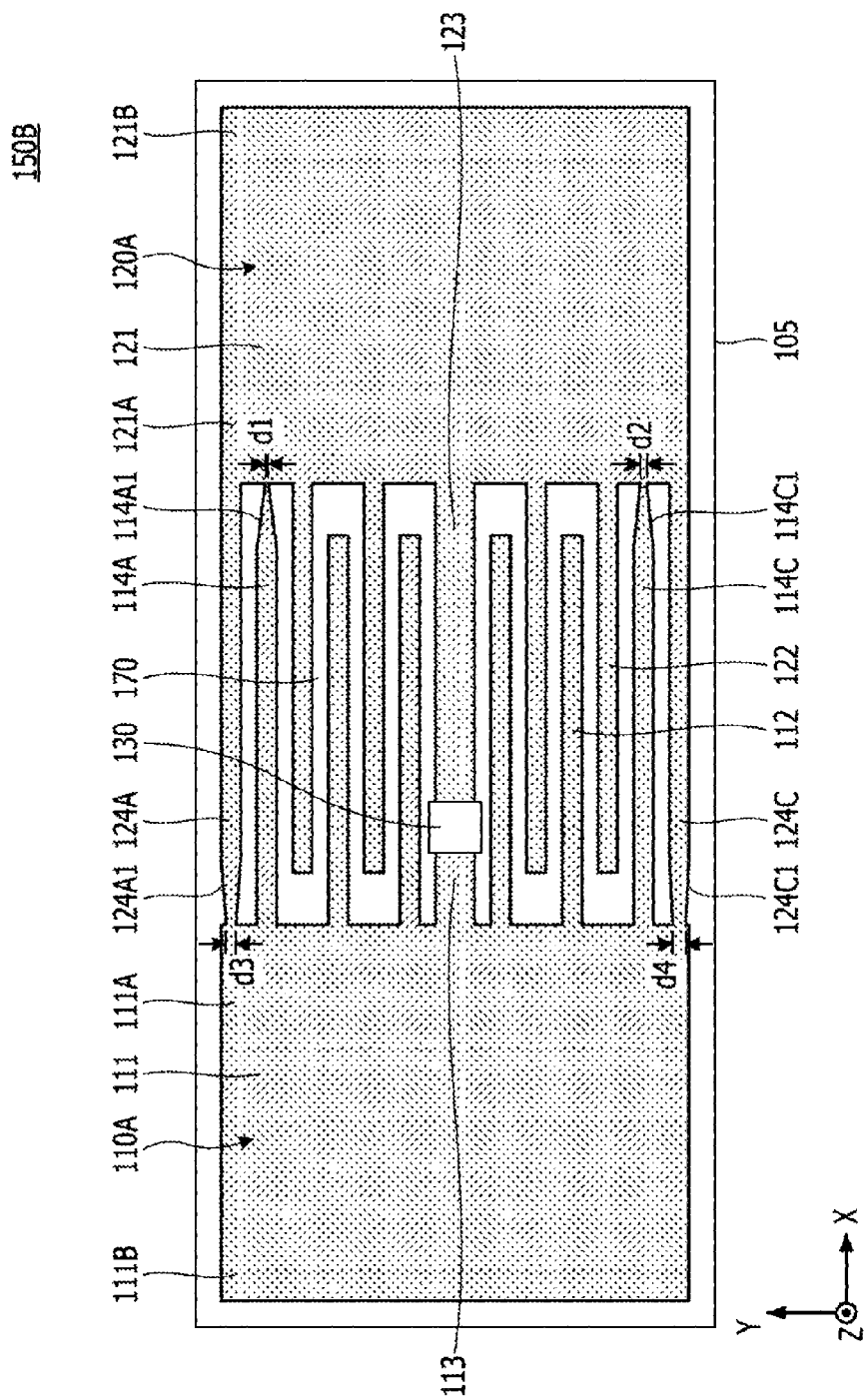
FIG. 15 is a diagram illustrating an inlay according to a modification example of an embodiment.

FIG. 15 is a diagram illustrating an inlay 150B according to a modification example of the embodiment. In FIG. 15, component elements similar to those of the RFID tag 100 and the inlay 150 of the embodiment are denoted by the same reference numerals, and description thereof is omitted.

The inlay 150B includes the sheet portion 105, antenna elements 110A and 120A, and the IC chip 130.

The antenna element 110A includes the element 111, the protruding portions 112, the wiring portion 113, and connection portions 114A and 114C. The connection portions 114A and 114C are similar to the connection portion 124A illustrated in FIGS. 4A to 6 and extend from the element 111 in the positive X-axis direction.

The connection portion 114A is positioned between the protruding portion 122 positioned on a most positive side in the Y-axis direction and the connection portion 124A. The connection portion 114C is positioned between the protruding portion 122 positioned on a most negative direction side in the Y-axis direction and a connection portion 124C.

The connection portions 114A and 114C include tapered portions 114A1 and 114C1 at tips of the connection portions 114A and 114C, and the tapered portions 114A1 and 114C1 are connected to the element 121. The tapered portions 114A1 and 114C1 have tapered shapes in which widths thereof decrease in the positive X-axis direction.

The antenna element 120A includes the element 121, the protruding portions 122, the wiring portion 123, and the connection portions 124A and 124C. The connection portion 124A is similar to the connection portion 124A illustrated in FIGS. 4A to 6. The connection portion 124C is similar to the connection portion 124A illustrated in FIGS. 4A to 6 and extends from the element 121 in the negative X-axis direction.

The connection portion 124A is positioned on a positive Y-axis side than the connection portion 114A. That is, the connection portion 124A is positioned on a most positive side in the Y-axis direction. The connection portion 124C is positioned on a negative Y-axis side than the connection portion 114C. That is, the connection portion 124C is positioned on a most negative side in the Y-axis direction.

The connection portions 124A and 124C include tapered portions 124A1 and 124C1 at tips of the connection portions 124A and 124C, and the tapered portions 124A1 and 124C1 are connected to the element 111. The tapered portions 124A1 and 124C1 have tapered shapes in which widths thereof decrease in the negative X-axis direction.

These antenna elements 110A and 120A is wound around the base portion 101 to constitute the loop antenna in the same manner as the antenna elements 110 and 120.

Here, the tapered portions 114A1, 114C1, 124A1, and 124C1 are different in thickness from each other. Thicknesses at tips of the tapered portions 114A1, 114C1, 124A1, and 124C1 are respectively set to d1, d2, d3, and d4 (d1<d2<d3<d4).

The thicknesses at the tips of the tapered portions 114A1, 114C1, 124A1, and 124C1 are as follows. The thicknesses of the tapered portions 114A1 and 114C1 are widths in the Y-axis direction of parts (thinnest portions of tapered portions 114A1 and 114C1) connected to the element 121 at end portions in the positive X-axis direction. The thicknesses of the tapered portions 124A1 and 124C1 are widths in the Y-axis direction of parts (thinnest portions of tapered portions 124A1 and 124C1) connected to the element 111 at end portions in the negative X-axis direction.

The thicknesses d1, d2, d3, and d4 of the tapered portions 114A1, 114C1, 124A1, and 124C1 are set so as to satisfy a relationship of d1<d2<d3<d4. This is because the tapered portions 114A1, 114C1, 124A1, and 124C1 are separated in this order and capacitance of the interdigital portion 170 is increased in this order of the tapered portions 114A1, 114C1, 124A1, and 124C1 in the wet etching.

In addition, the connection portion 114A is disposed on an inner side than the connection portion 124A. This is because the tapered portion 114A1 is separated before the tapered portion 124A1 and capacitance is obtained between the connection portion 114A and the protruding portion 122 on a negative Y-axis direction side.

This is because if the tapered portion 124A1 is separated before the tapered portion 114A1, capacitance is not included in the interdigital portion 170 due to the protruding portion 124B (see FIG. 8) appeared when the tapered portion 114A1 is not separated and the tapered portion 124A1 is separated.

In addition, this is because if the tapered portion 124A1 is separated after the tapered portion 114A1 is separated and a protruding portion appears, capacitance obtained between the protruding portion appeared when the tapered portion 114A1 is separated and the protruding portion 124B when the tapered portion 124A1 is separated is included in the interdigital portion 170.

For the same reason, the connection portion 114C is disposed on an inner side than the connection portion 124C. This is because the tapered portion 114C1 is separated before the tapered portion 124C1 and capacitance is combined between the protruding portions 122 on a negative Y-axis direction side.

The thicknesses d1, d2, d3, and d4 are set so as to satisfy the relationship of d1<d2<d3<d4 and the connection portions 114A and 114C are respectively disposed on the inner side than the connection portions 124A and 124C, so that it is possible to separate the tapered portions 114A1, 114C1, 124A1, and 124C1 in this order and to increase capacitance of the interdigital portion 170 in this order.

Figure 16:
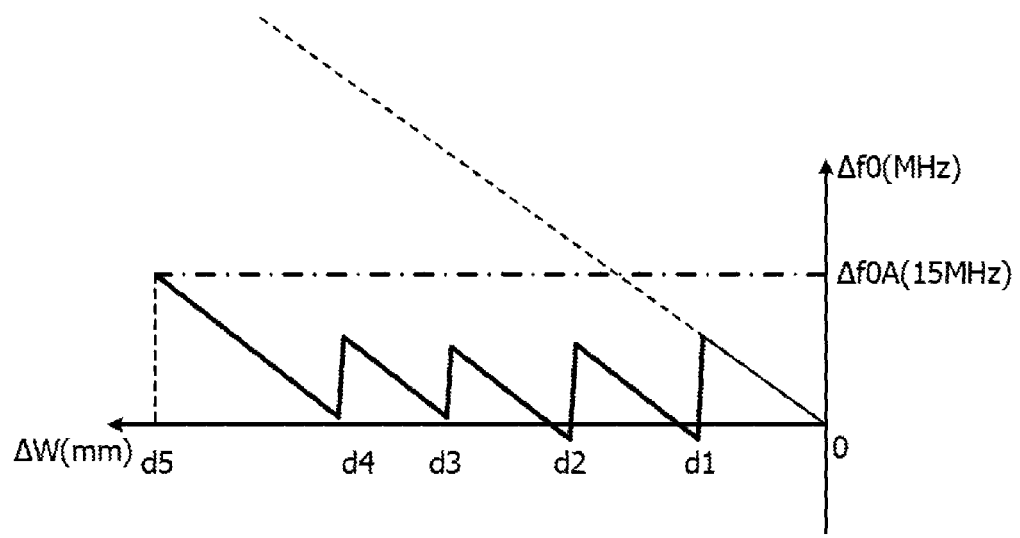
FIG. 16 is a characteristic diagram illustrating a relationship between an amount of etching and an amount of variation of the resonance frequency in the RFID tag using the inlay.

FIG. 16 is a characteristic diagram illustrating a relationship between an amount of etching and an amount of variation of the resonance frequency in the RFID tag 100 using the inlay 150B. In FIG. 16, a horizontal axis illustrates an amount of variation ΔW with respect to a design value of the amount of etching. In addition, a vertical axis illustrates an amount of variation Δf0 with respect to a design value of a resonance frequency f0. The horizontal axis and vertical axis of FIG. 16 are the same as the horizontal axis and vertical axis of FIG. 11 and FIG. 14.

When the amount of variation ΔW with respect to the design value of the amount of etching is increased from zero (0), since capacitance of the interdigital portion 170 is decreased, the resonance frequency f0 is increased. With this, the amount of variation Δf0 is increased.

When the amount of variation ΔW reaches d1, since the tapered portion 114A1 is separated, the connection portion 114A replaces a protruding portion, and capacitance obtained by the protruding portion based on the connection portion 114A is added to the interdigital portion 170, the resonance frequency is decreased. With this, the amount of variation Δf0 is decreased. In FIG. 16, although the amount of variation Δf0 is below zero (0), even if the amount of variation Δf0 falls below zero (0) as described above, if the frequency is equal to or higher than a frequency obtained by subtracting the allowable value Δf0A from the resonance frequency f0, there is no hindrance in communication.

Similarly, when the amount of variation ΔW is increased from d1 and reaches d2, since the tapered portion 114C1 is separated, the connection portion 114C is changed to a protruding portion, and capacitance obtained by the protruding portion based on the connection portion 114C is added to the interdigital portion 170, the resonance frequency is decreased. With this, the amount of variation Δf0 is decreased.

In addition, when the amount of variation ΔW is further increased from d2 and reaches d3, since the tapered portion 124A1 is separated, the connection portion 124A is changed to the protruding portion 124B (see FIG. 8), and capacitance obtained by the protruding portion 124B is added to the interdigital portion 170, the resonance frequency is decreased. With this, the amount of variation Δf0 is decreased.

In addition, when the amount of variation ΔW is further increased from d3 and reaches d4, since the tapered portion 124C1 is separated, the connection portion 124C is changed to a protruding portion, and capacitance obtained by the protruding portion based on the connection portion 124C is added to the interdigital portion 170, the resonance frequency is decreased. With this, the amount of variation Δf0 is decreased.

When the amount of variation ΔW is further increased from d4 and reaches d5, the amount of variation Δf0 reaches the allowable value Δf0A.

The RFID tag 100 using the inlay 150B of the modification example of the embodiment may perform an appropriate operation even if the amount of variation ΔW is changed from zero (0) to d5 in the wet etching for patterning the antenna elements 110A and 120A.

As described above, according to the modification example of the embodiment, it is possible to provide the RFID tag 100 capable of performing an appropriate operation at a desired communication frequency. In addition, it is possible to provide the RFID tag 100 which is particularly effective in a case where variation of the amount of etching is large by including the four the connection portions 114A, 114C, 124A, and 124C with different widths of the tapered portions 114A1, 114C1, 124A1, and 124C1.

Furthermore, in the modification of the embodiment, although the RFID tag 100 includes the four the connection portions 114A, 114C, 124A, and 124C with different widths of the tapered portions 114A1, 114C1, 124A1, and 124C1, in a case of providing a plurality of connection portions having such tapered portions, the RFID tag 100 may include any number of the connection portions as long as the number of the connection portions is equal to or more than two.

In the above descriptions, although the inlay 150 or 150B is wound around the base portion 101 and the RFID tag 100 is covered with the cover portion 140, the element 150A (see FIG. 6) before attaching the IC chip 130 is wound around the base portion 101 and it may be used as a high frequency circuit.

Figure 17A:
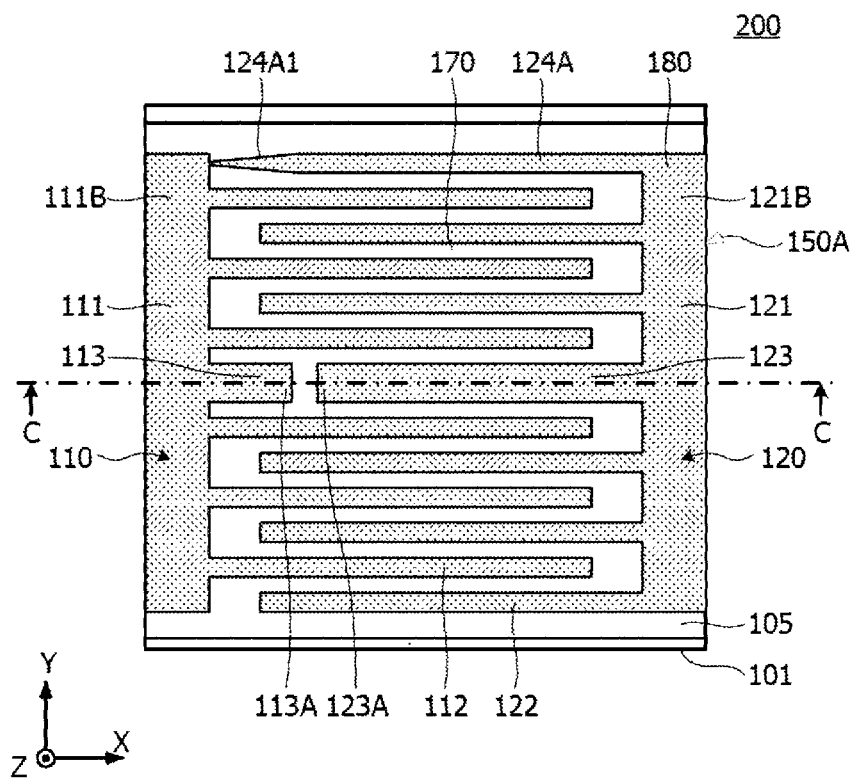
FIGS. 17A and 17B are diagrams illustrating a high frequency circuit.
Figure 17B:
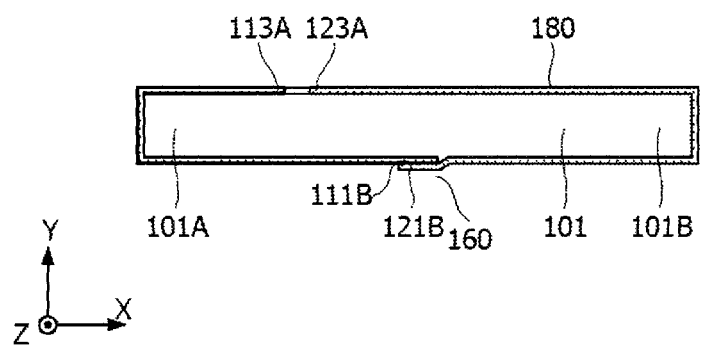
Figure 18:
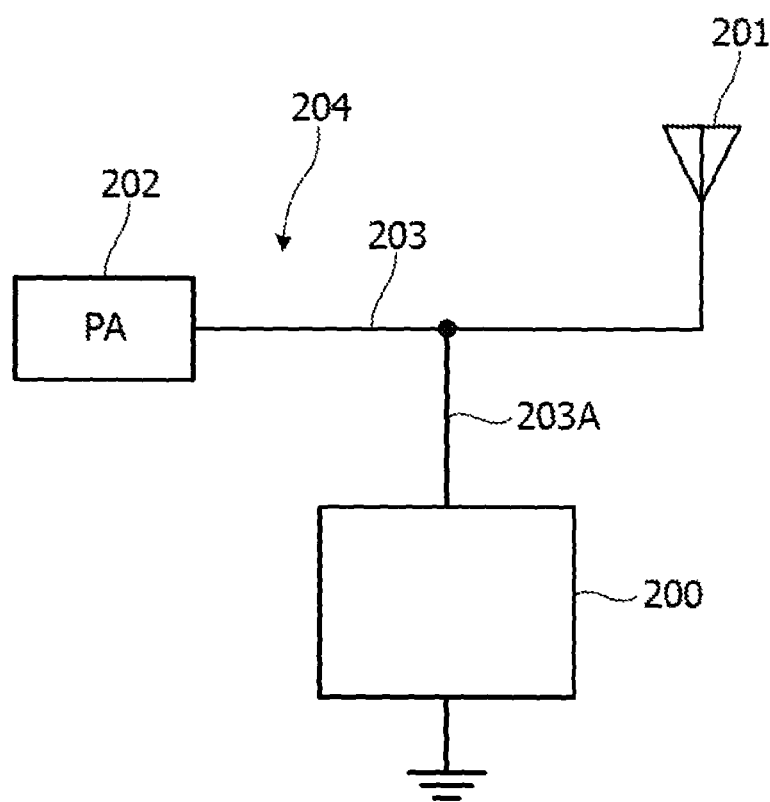
FIG. 18 is a diagram illustrating an implementation example of the high frequency circuit.

FIGS. 17A and 17B are diagrams illustrating a high frequency circuit 200. FIG. 18 is a diagram illustrating an implementation example of the high frequency circuit 200. FIG. 17A illustrates a configuration of the high frequency circuit 200 in plan view and FIG. 17B illustrates a cross section taken along arrows of XVIIB-XVIIB in FIG. 17A.

The high frequency circuit 200 includes the element 150A and the base portion 101 and the element 150A is wound around the base portion 101. The high frequency circuit 200 is a circuit having one of the terminals 113A and 123A as an input terminal and the other as an output terminal.

As illustrated in FIG. 18, the high frequency circuit 200 is connected to, for example, a branch line 203A branched from a microstrip line 203 connecting an antenna 201 and a power amplifier (PA) 202. A communication device 204 includes the antenna 201, the PA 202, the microstrip line 203, and the branch line 203A. The communication device 204 is, for example, a smartphone terminal, a mobile phone terminal, a tablet computer, a portable game machine, and the like.

The antenna 201 is built in a case of the communication device 204 and communicates, for example, with a communication bandwidth of 1.5 GHz. Although a duplexer may be provided between the PA 202 and the antenna 201, the duplexer is omitted here. In addition, although a central processing unit (CPU) chip is connected to the PA 202 via, for example, a modulator/demodulator, the CPU chip is omitted here.

The microstrip line 203 is provided on a surface of the wiring substrate. This wiring substrate includes a ground plane overlapping with the microstrip line 203 in plan view.

The branch line 203A is a microstrip line overlapping with the ground plane and is connected to the terminal 113A (see FIGS. 17A and 17B) of the high frequency circuit 200. The terminal 123A (see FIGS. 17A and 17B) of the high frequency circuit 200 is connected to the ground plane of the wiring substrate in which the branch line 203A is provided through the via hole or the like.

The resonance frequency f0 of the high frequency circuit 200 is set to, for example, 2.5 GHz and an allowable range of the resonance frequency f0 is set to 2.5 GHz±15%. For example, 2.5 GHz is a communication bandwidth used for a wireless local area network (LAN).

Although the communication device 204 performs communication at a communication bandwidth of 1.5 GHz through the antenna 201, there is a case where a signal of 2.5 GHz is received through the antenna 201. That is, there is a case the communication device 204 receives the signal of 2.5 GHz in addition to a signal of 1.5 GHz through the antenna 201.

In this case, since the resonance frequency f0 of the high frequency circuit 200 is set to 2.5 GHz, the signal of 2.5 GHz received by the antenna 201 is input from the antenna 201 to the high frequency circuit 200 through the microstrip line 203 and the branch line 203A and resonates. Accordingly, the signal of 2.5 GHz received by the antenna 201 is not transmitted to the PA 202.

This uses a notch function of the high frequency circuit 200, and the signal of 2.5 GHz is cut by the notch function of the high frequency circuit 200.

If the high frequency circuit 200 is manufactured in the wet etching, there is a case where the resonance frequency of the high frequency circuit 200 is shift due to variation in the amount of etching when the antenna elements 110 and 120 are patterned.

In this case, since the allowable range of the resonance frequency f0 (2.5 GHz)±15% is realized by the connection portion 124A, it is possible to provide the high frequency circuit 200 with an appropriate operation even if variation of the amount of etching occurs.

Here, in a case where the allowable range of the resonance frequency f0 (2.5 GHz)±15% is realized using the connection portion 124A, for example, the design value described with reference to FIGS. 1 to 16 may be set to a level of −15%, the allowable value Δf0A may be set to a level of +15%, and a level of 0% may be set to a median value between the level of −15% and the level of +15%.

Furthermore, although the notch function for the high frequency circuit 200 has been described here, the notch function may be used for other purposes.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An RFID tag comprising:
a base portion in a plate shape made of dielectric material;
a loop antenna formed by etching and including a first antenna element and a second antenna element disposed in a loop shape along an outer periphery of the base portion; and
an IC chip inserted to the loop antenna in series and including a first electrode and a second electrode,
wherein the first antenna element includes
a first base portion disposed along the outer periphery of the base portion,
a first wiring portion protruding from the first base portion and being connected to the first electrode, and
a plurality of first protruding portions protruding from the first base portion in a comb shape along the first wiring portion,
wherein the second antenna element includes
a second base portion disposed along the outer periphery of the base portion,
a second wiring portion protruding from the second base portion toward a first terminal and being connected to the second electrode, and
a plurality of second protruding portions protruding from the second base portion in a comb shape along the second wiring portion and being disposed alternately with the plurality of first protruding portions,
wherein the second antenna element further includes one of
a connection portion in a linear shape formed by the etching such that the connection portion is disposed along the first protruding portion and the second protruding portion and the first base portion and the second base portion are connected to each other and
a third protruding portion formed by the etching in which the connection portion is separated,
wherein the connection portion includes
a first connection portion and a second connection portion disposed in series between the first base portion and the second base portion and a line width of the first connection portion is narrower than a line width of the second connection portion, and
wherein the third protruding portion protrudes from the second base portion along the plurality of second protruding portions.

2. The RFID tag according to claim 1,
wherein the first connection portion has a tapered shape narrower than the line width of the second connection portion in plan view.

3. The RFID tag according to claim 1,
wherein the first connection portion is positioned to be connected to the first base portion and the second connection portion is positioned to be connected to the second base portion.

4. The RFID tag according to claim 1,
wherein the connection portion is disposed next to the second protruding portion positioned on a most outer side among the plurality of second protruding portions in plan view.

5. The RFID tag according to claim 1,
wherein the second antenna element includes a plurality of connection portions each of which is the connection portion including the first connection portion and the second connection portion, and line widths of the first connection portions of the plurality of connection portions are different from each other and are narrower than line widths of the second connection portions.

6. The RFID tag according to claim 5,
wherein each of the plurality of connection portions is disposed on a more outer side as a size of a line width of the first connection portion is larger in plan view among the plurality of connection portions and is disposed on a more inner side as a size of a line width of the first connection portion is smaller in plan view among the plurality of connection portions.

7. The RFID tag according to claim 1,
wherein the plurality of first protruding portions and the plurality of second protruding portions constitute an interdigital portion.

8. The RFID tag according to claim 1,
wherein the first wiring portion includes the first terminal at a tip, and
wherein the second wiring portion includes a second terminal at a tip.

9. An RFID tag comprising:
a base portion in a plate shape made of dielectric material;
a loop antenna including a first antenna element and a second antenna element disposed in a loop shape along an outer periphery of the base portion; and
an IC chip inserted to the loop antenna in series and including a first electrode and a second electrode,
wherein the first antenna element includes
a first base portion disposed along the outer periphery of the base portion,
a first wiring portion protruding from the first base portion and being connected to the first electrode, and
a plurality of first protruding portions protruding from the first base portion in a comb shape along the first wiring portion,
wherein the second antenna element includes
a second base portion disposed along the outer periphery of the base portion,
a second wiring portion protruding from the second base portion toward a first terminal and being connected to the second electrode,
a plurality of second protruding portions protruding from the second base portion in a comb shape along the second wiring portion and being disposed alternately with the plurality of first protruding portions, and
a connection portion in a linear shape which is disposed along the first protruding portion and the second protruding portion and interconnects the first base portion and the second base portion, and
wherein the connection portion includes a first connection portion and a second connection portion disposed in series between the first base portion and the second base portion and a line width of the first connection portion is narrower than a line width of the second connection portion.

10. The RFID tag according to claim 9,
wherein the first connection portion has a tapered shape narrower than the line width of the second connection portion in plan view.

11. The RFID tag according to claim 9,
wherein the first connection portion is positioned to be connected to the first base portion and the second connection portion is positioned to be connected to the second base portion.

12. The RFID tag according to claim 9,
wherein the connection portion is disposed next to the second protruding portion positioned on a most outer side among the plurality of second protruding portions in plan view.

13. The RFID tag according to claim 9,
wherein the second antenna element includes a plurality of connection portions each of which is the connection portion including the first connection portion and the second connection portion, and line widths of the first connection portions of the plurality of connection portions are different from each other and are narrower than line widths of the second connection portions.

14. The RFID tag according to claim 13,
wherein each of the plurality of connection portions is disposed on a more outer side as a size of a line width of the first connection portion is larger in plan view among the plurality of connection portions and is disposed on a more inner side as a size of a line width of the first connection portion is smaller in plan view among the plurality of connection portions.

15. The RFID tag according to claim 9,
wherein the plurality of first protruding portions and the plurality of second protruding portions constitute an interdigital portion.

16. The RFID tag according to claim 9,
wherein the first wiring portion includes the first terminal at a tip, and
wherein the second wiring portion includes a second terminal at a tip.

17. An RFID tag comprising:
a base portion in a plate shape made of dielectric material;
a loop antenna including a first antenna element and a second antenna element disposed in a loop shape along an outer periphery of the base portion; and
an IC chip inserted to the loop antenna in series and including a first electrode and a second electrode,
wherein the first antenna element includes
a first base portion disposed along the outer periphery of the base portion,
a first wiring portion protruding from the first base portion and being connected to the first electrode, and
a plurality of first protruding portions protruding from the first base portion in a comb shape along the first wiring portion,
wherein the second antenna element includes
a second base portion disposed along the outer periphery of the base portion,
a second wiring portion protruding from the second base portion toward a first terminal and being connected to the second electrode, and
a plurality of second protruding portions protruding from the second base portion in a comb shape along the second wiring portion and being disposed alternately with the plurality of first protruding portions, and wherein a width in the protruding direction of a tip of at least one second protruding portion among the plurality of second protruding portions is narrower than a width of a part of the protruding portion protruding from the second base portion.

18. The RFID tag according to claim 17,
wherein the plurality of first protruding portions and the plurality of second protruding portions constitute an interdigital portion.

19. A high frequency circuit comprising:
a base portion in a plate shape made of dielectric material; and
a loop element formed by etching and including a first element and a second element disposed in a loop shape along an outer periphery of the base portion,
wherein the first element includes
a first base portion disposed along the outer periphery of the base portion,
a first wiring portion protruding from the first base portion and including a first terminal at a tip, and
a plurality of first protruding portions protruding from the first base portion in a comb shape along the first wiring portion,
wherein the second element includes
a second base portion disposed along the outer periphery of the base portion,
a second wiring portion protruding from the second base portion toward the first terminal and including a second terminal at a tip, and
a plurality of second protruding portions protruding from the second base portion in a comb shape along the second wiring portion and being disposed alternately with the plurality of first protruding portions,
wherein the second element further includes one of
a connection portion in a linear shape formed by the etching such that the connection portion is disposed along the first protruding portion and the second protruding portion and the first base portion and the second base portion are connected to each other and
a third protruding portion formed by the etching in which the connection portion is separated,
wherein the connection portion includes a first connection portion and a second connection portion disposed in series between the first base portion and the second base portion and a line width of the first connection portion is narrower than a line width of the second connection portion, and
wherein the third protruding portion protrudes from the second base portion along the plurality of second protruding portions.

20. A high frequency circuit comprising:
a base portion in a plate shape made of dielectric material; and
a loop element including a first element and a second element disposed in a loop shape along an outer periphery of the base portion,
wherein the first element includes
a first base portion disposed along the outer periphery of the base portion,
a first wiring portion protruding from the first base portion and including a first terminal at a tip, and
a plurality of first protruding portions protruding from the first base portion in a comb shape along the first wiring portion,
wherein the second element includes
a second base portion disposed along the outer periphery of the base portion,
a second wiring portion protruding from the second base portion toward the first terminal and including a second terminal at a tip,
a plurality of second protruding portions protruding from the second base portion in a comb shape along the second wiring portion and being disposed alternately with the plurality of first protruding portions, and
a connection portion in a linear shape which is disposed along the first protruding portion and the second protruding portion and interconnects the first base portion and the second base portion, and
wherein the connection portion includes a first connection portion and a second connection portion disposed in series between the first base portion and the second base portion and a line width of the first connection portion is narrower than a line width of the second connection portion.

* * * * *